(12) United States Patent
Hagano

(10) Patent No.: US 9,174,530 B2
(45) Date of Patent: Nov. 3, 2015

(54) FUEL TANK OPENING-CLOSING DEVICE

(71) Applicant: TOYODA GOSEI CO., LTD., Kiyosu-shi, Aichi-ken (JP)

(72) Inventor: Hiroyuki Hagano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 566 days.

(21) Appl. No.: 13/626,009

(22) Filed: Sep. 25, 2012

(65) Prior Publication Data

US 2013/0075399 A1 Mar. 28, 2013

(30) Foreign Application Priority Data

Sep. 27, 2011 (JP) ................................. 2011-210422
Sep. 27, 2011 (JP) ................................. 2011-210425

(51) Int. Cl.
*B60K 15/04* (2006.01)

(52) U.S. Cl.
CPC ..... *B60K 15/0406* (2013.01); *B60K 2015/0461* (2013.01); *B60K 2015/0483* (2013.01)

(58) Field of Classification Search
CPC ................ B60K 2015/0483; B60K 2015/0461
USPC ................... 141/350, 367; 220/86.2
See application file for complete search history.

(56) References Cited

U.S. PATENT DOCUMENTS

| | | | |
|---|---|---|---|
| 6,691,750 B1 * | 2/2004 | Foltz .............................. | 141/350 |
| 6,923,224 B1 * | 8/2005 | McClung et al. ............. | 141/350 |
| 7,077,178 B2 * | 7/2006 | Hedevang ...................... | 141/367 |
| 7,318,462 B2 * | 1/2008 | Ganachaud .................... | 141/350 |
| 7,640,954 B2 * | 1/2010 | Bar ................................ | 141/350 |
| 7,967,042 B2 * | 6/2011 | Groom et al. ................. | 141/367 |
| 8,167,010 B2 * | 5/2012 | Yoshida ......................... | 141/350 |
| 8,807,369 B2 * | 8/2014 | Sasaki ........................... | 220/86.2 |
| 2006/0060581 A1 | 3/2006 | Foltz et al. | |
| 2009/0056831 A1 * | 3/2009 | Journee ......................... | 141/350 |
| 2009/0279962 A1 | 11/2009 | Dufour et al. | |

FOREIGN PATENT DOCUMENTS

| | | |
|---|---|---|
| JP | 60-87721 U | 6/1985 |
| JP | 2008-49952 A | 3/2008 |
| JP | 2009-173149 A | 8/2009 |
| JP | 2011-519744 A | 7/2011 |
| WO | 2010/099015 A1 | 9/2010 |
| WO | 2011/053563 A1 | 5/2011 |

* cited by examiner

*Primary Examiner* — Timothy L Maust
(74) *Attorney, Agent, or Firm* — Posz Law Group, PLC

(57) ABSTRACT

The fuel tank opening-closing member has a tank opening forming member having a first opening forming member which has a first opening, and a first flap valve mechanism having a first opening-closing member for opening and closing the first opening, and a first shaft for rotatably supporting one end part of the first opening-closing member. The first opening-closing member is equipped with a pressing part having a push face pressed by the tip of the fueling nozzle, and a restriction wall forming a restriction region which restricts so as to allow insertion only of specified fueling nozzle external shapes established along the outer edge of the push face, enclosing at least a portion of the push face, and a guide member which is formed tilted toward the top part of the restriction wall, and leads the tip of the fueling nozzle to the restriction region.

17 Claims, 18 Drawing Sheets

FUEL TANK OPENING-CLOSING DEVICE

This application claims the benefit of and priority from Japanese Application. No. 2011-210422 filed Sep. 27, 2011 and No. 2011-210425 filed Sep. 27, 2011, the contents of which are incorporated herein by reference.

BACKGROUND OF THE INVENTION

1. Field of the Invention

The present invention relates to a fuel tank opening-closing device which opens a flap valve using the moving force of a fueling nozzle to supply fuel to a fuel tank.

2. Description of the Related Art

Fuel tank opening-closing devices are disclosed in JP-A 2008-49952A and WO 2010-99015. The fuel tank opening-closing devices are equipped with a shutter mechanism (flap valve mechanism) for opening and closing an injection port of the tank opening forming member, and a lock mechanism that allows the opening operation of the shutter mechanism. The lock mechanism is equipped with an internal diameter positioning part of the nozzle guide part (nozzle detection mechanism), and a locking member. The nozzle detection mechanism is pressed by the tip of the inner diameter part of the fueling nozzle to move the locking member from the locked position to the unlocked position, and allows the shutter mechanism opening operation. The shutter is opened by pressing with the tip of the fueling nozzle, and thus fueling is performed.

However, with the fuel tank opening-closing devices, there is the problem that the constitution for guiding the tip of the fueling nozzle to a designated position (internal diameter positioning part) of the shutter mechanism became complex.

SUMMARY

An advantage of some aspects of the invention is to provide a fuel tank opening-closing device with a simple constitution for guiding the tip of the fueling nozzle to the designated position of the opening-closing member during fueling.

According to an aspect of the invention, there is a fuel tank opening-closing device that opens and closes a fuel passage for supplying fuel discharged by a fueling nozzle to a fuel tank. The fuel tank opening-closing device comprises: a tank opening forming member that includes the fuel passage and a first opening forming member, disposed in the fuel passage and having a first opening, and a first flap valve mechanism having a first opening-closing member for opening and closing the first opening, and a first shaft rotatably supporting an end part of the first opening-closing member on the first opening forming member. The first opening-closing member includes: a pressing part that has a push face pressed by an end of the fueling nozzle and a restriction wall forming a restriction region that restricts so as to selectively allow insertion of a specific outer form of the fueling nozzle, the restriction wall being configured to be erected along an outer edge of the push face and to enclose at least a portion of the push face, and a guide member that is formed and inclined to broaden a nozzle guiding space from an upper part of the restriction wall to an insertion direction of the fueling nozzle, the guide member being configured to guide the end of the fueling nozzle to the restriction region.

With the fuel tank opening-closing device of the application example, when the fueling nozzle is inserted toward the first opening of the fuel passage of the tank opening forming member, the push face of the first opening-closing member of the first flap valve mechanism is pressed by the tip of the fueling nozzle, and the first opening-closing member rotates with the first shaft at the center and opens the first opening. Specifically, the tip of the fueling nozzle is guided to the inclined surface of the guide part of the first opening-closing member, and furthermore, after it enters the restriction region enclosed by a restriction wall, it reaches the push face. The restriction region enclosed by the restriction wall is formed along the outer edge of the push face pressed by a fueling nozzle of a specific external shape and such that insertion is selectively possible by a specific external shape of a fueling nozzle, so there is restriction keeping fueling nozzles of a designated diameter or greater from reaching the push face. Therefore, when the type of fuel differs according to the external shape of the fueling nozzle, even when the fueling nozzle is inserted accidentally, the first opening does not open, so the wrong type of fuel is not supplied.

Also, with the restriction region enclosed by the restriction wall, even if it is a region restricted by a specific external shape of the fueling nozzle, the guide part is provided tilting so as to broaden from the top part of the restriction wall toward the insertion direction of the fueling nozzle, so the tip of the fueling nozzle is guided to the push face through the restriction region via the guide parts, so that the fuel nozzle insertion work can be done smoothly.

With the application example, the aforementioned restriction wall is formed in a U shape having a flat part open at one side, and this flat part can have a constitution for which it is disposed at the free end side opposite one end part of the first opening-closing member. With this constitution, when the first opening-closing member rotates with the first shaft at the center, the tip of the fueling nozzle follows the flat part, and does not catch on the guide part, so it is possible to perform the opening operation of the first opening-closing member smoothly.

With the application example, it is possible to further equip an opening-closing activation member having a nozzle detection member pressed by the tip of the fueling nozzle, and a lock member that works in conjunction with the nozzle detecting member, and has a locked position for restricting the opening and closing operation of the first opening-closing member and an unlocked position for allowing the opening and closing operation, and can have a constitution such that the nozzle detecting member is disposed on the restriction wall, and by being pressed by the tip of the fueling nozzle inserted in the restriction region, switches the locking member from the locked position to the unlocked position. With this constitution, the nozzle detection member is disposed on the restriction wall, so when the tip of the fueling nozzle enters the restriction region, it is possible to reliably press the nozzle detecting member.

Also, with the opening-closing activation member, the restriction region for making it possible to selectively insert specific external shapes of a fueling nozzle is restricted by a restriction wall, but it is also acceptable for the nozzle detection member not to be given a function of detecting the specific external shape of the fueling nozzle. Thus, it is possible to reliably detect the fueling nozzle simply by installing just one nozzle detecting member, and to make the opening-closing activation mechanism constitution simple.

The guide part is provided on the first opening-closing member, specifically, it is not provided on the tank opening forming member which easily ends up with a large diameter, so it is possible to use a simple constitution with the outer diameter of the tank opening forming member or the like made smaller.

With the application example, it is possible to have a constitution whereby the tank opening forming member is within the fuel passage and is disposed more to the fuel tank side than the first opening forming member, and to be equipped with a second flap valve mechanism which has a second opening forming member having a second opening, and furthermore, has a second opening-closing member that opens and closes the second opening, and a second shaft that rotatably supports one end part of the second opening-closing member.

The application example is characterized by being a fuel tank opening-closing device that opens and closes a fuel passage that supplies fuel discharged from a fueling nozzle to a fuel tank, equipped with:

a tank opening forming member having the fuel passage, a first opening forming member having a first opening disposed in the fuel passage, and a second opening forming member that is within the fuel passage and disposed further to the fuel tank side than the first opening forming member, a first flap valve mechanism having a first opening-closing member for opening and closing the first opening, and a first shaft that rotatably supports one end part of the first opening-closing member mounted on the tank opening forming member, and a second flap valve mechanism having a second opening-closing member for opening and closing the second opening, and a second shaft that rotatably supports one end part of the second opening-closing member mounted on the tank opening forming member, wherein when the center axis that passes through almost the center of the fuel is CA, the first opening-closing member has an arc shaped sliding end at the free end of the first opening-closing member of the side opposite the center axis in relation to the first shaft, and the second opening-closing member has a sliding surface for which the sliding end slides in line contact by the opening operation of the first opening-closing member on the surface facing opposite the first opening-closing member.

With the fuel tank opening-closing device of the application example, when the fueling nozzle is inserted toward the first opening of the fuel passage of the tank opening forming member, the first opening-closing member of the first flap valve mechanism is pressed by the tip of the fueling nozzle, and the first opening-closing member rotates with the first shaft at the center and opens the first opening. Furthermore, when the fueling nozzle is inserted in the fuel passage, and the second opening-closing member of the second flap valve mechanism is pressed by the tip of the fueling nozzle, the first opening-closing member rotates with the first shaft at the center and opens the first opening. Furthermore, when the fueling nozzle is inserted in the fuel passage, when the second opening-closing member of the second flap valve mechanism is pressed by the tip of the fueling nozzle, the second opening-closing member rotates with the second shaft at the center, and opens the second opening. The fueling nozzle is inserted from the second opening into the fuel tank side fuel passage, the fuel discharged from the fueling nozzle is supplied to the fuel passage, and is sent to the fuel tank.

When this kind of first opening-closing member performs the opening operation, by the sliding end provided on the free end side of the first opening-closing member sliding on the sliding surface of the second opening-closing member in line contact, the dust that was on the sliding surface is removed from the sliding surface to the second shaft side. In other words, dust and the like is removed from this sliding surface which is a location that receives the pressing force from the tip of the fueling nozzle. Thus, the dust or the like on the second opening-closing member can be prevented from entering the fuel tank connected to the fuel passage without dropping to the fuel passage of the fuel tank side due to tilting of the second opening-closing member.

With another application example, it is possible to have a constitution for which when the direction facing from the second shaft to the free end of the second opening-closing member is the first direction, and the direction perpendicular to the first direction is the second direction, the sliding surface is formed from a curved surface for which the surface area decreases in the second direction as it goes from the center of the second opening-closing member toward the first direction.

Furthermore, with another application example, it is possible to use a constitution for which the sliding surface is a surface that receives the force of the opening operation of the second opening-closing member with contact by the tip of the fueling nozzle. With this constitution, it is possible to prevent dust or the like swept by the tip of the fueling nozzle on the sliding surface from entering the fuel tank side fuel passage.

With a different application example, it is possible to have a constitution for which the first opening-closing member and the second opening-closing member are disposed such that the sliding surface receives the force of the opening operation of the second opening-closing operation by being pressed by the sliding end with the opening operation of the first opening-closing member. With this constitution, the second opening-closing member is pressed by the sliding end of the first opening-closing member, and the direct pressing force of the second opening-closing member by the top of the fueling nozzle is reduced, so it is possible to smoothly perform the opening operation of the second opening-closing member with little damage to the sliding surface.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
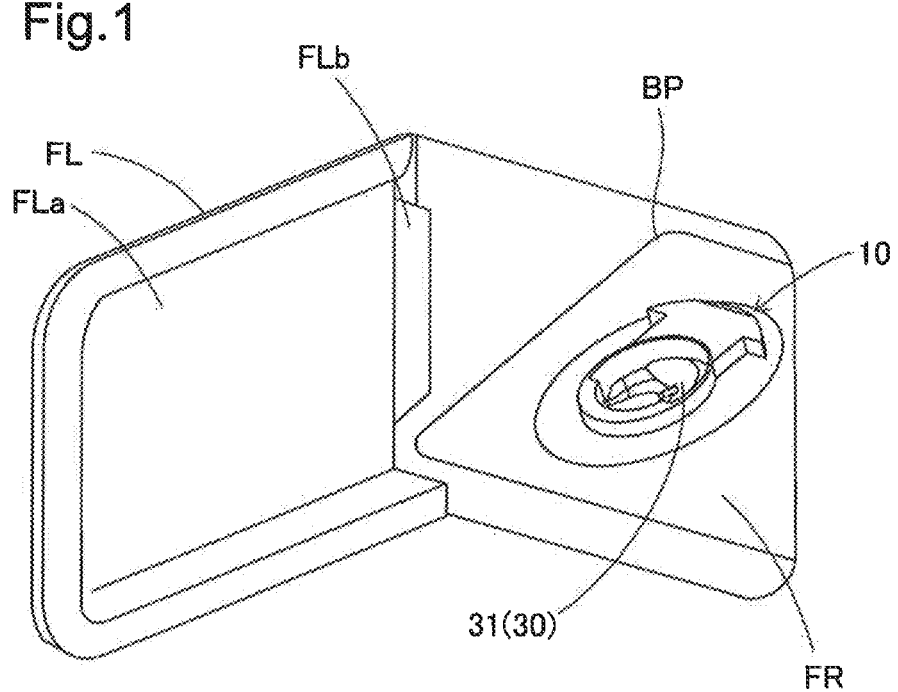
FIG. 1 is a perspective view describing the fuel tank opening-closing device of a first embodiment of the present invention.

A. First Embodiment
(1) Schematic Structure of the Fuel Tank Opening-Closing Device FIG. 1 is a perspective view describing a fuel tank opening-closing to device 10 of a first embodiment of the present invention. At the rear of the body of an automobile, a fueling lid FL for fueling fuel is supported to be able to open and close. With the fueling lid FL, a lid main body FLa is supported to be able to open and close on the outer plate of the car body via a hinge FLb along the outer panel of the car body The space opened by the fueling lid FL is a fueling bay FR, and inside the fueling bay FR is disposed the fuel tank opening-closing device 10 supported on a base plate BP. The fuel tank opening-closing device 10 is a mechanism for supplying fuel to the fuel tank without using a fuel cap, and this is a mechanism that is able to supply fuel to the fuel tank from the fueling nozzle by opening and closing the valve disposed in the fuel passage by outside force from the fueling nozzle after the fueling lid FL is opened. Following, we will describe the detailed constitution of the fuel tank opening-closing device.

(2) Structure and Operation of Each Part

Figure 2:
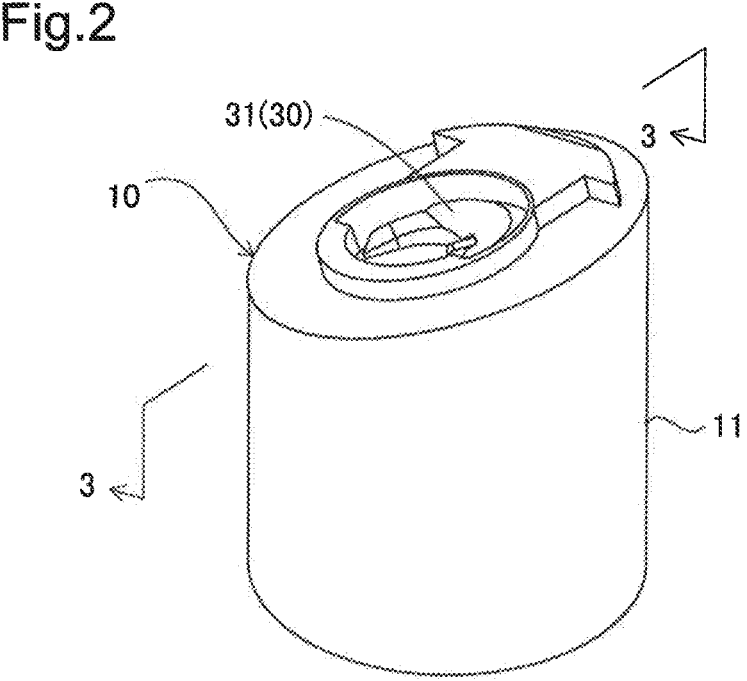
FIG. 2 is a perspective view showing the opening part of the fuel tank opening-closing device.
Figure 3:
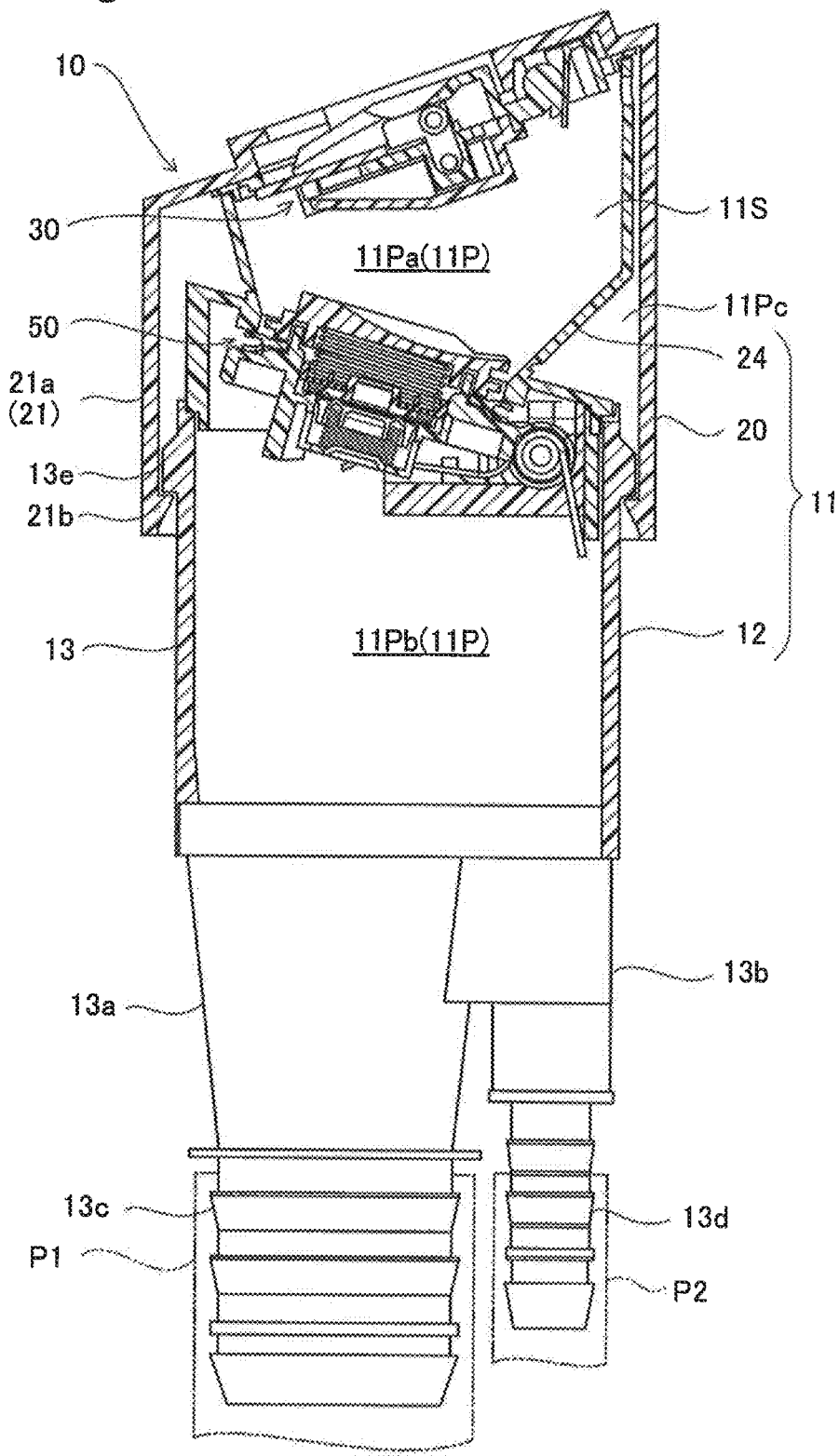
FIG. 3 is a cross section view along line 3-3 in FIG. 2.

FIG. 2 is a perspective view showing the opening part of the fuel tank opening-closing device 10, and FIG. 3 is a cross section view along line 3-3 in FIG. 2. In FIG. 3, the fuel tank opening-closing device 10 is equipped with a tank opening forming member 11 having a fuel passage 11P connected to the fuel tank (not illustrated), a first flap valve mechanism 30, and a second flap valve mechanism 50.

(2)-1 Tank Opening Forming Member 11

The tank opening forming member 11 is equipped with a pipe main body 12 which is a tube body forming the fuel passage 11P and is connected to the fuel tank via a fuel pipe P1, a cover member 20 mounted on the top end part of the pipe main body 12, and a passage forming member 24 fixed to the top of the pipe main body 12 and disposed within the cover member 20. The space enclosed by the cover member 20 on the top part of the pipe main body 12 is a valve connecting chamber 11S and a passage formation member 24: is disposed within that valve connecting chamber 11S.

The pipe main body 12 is equipped with a cylindrical portion 13, a first connecting part 13a formed at the bottom part of the cylindrical portion 13, and a second connecting part 13b formed at the bottom part of the cylindrical portion 13, and these are formed integrally as one unit. At the outer periphery part of the first connecting part 13a and the second connecting part 13b are respectively formed the barbed portions 13e and 13d for retaining the pipe, and the fuel pipe P1 and breather pipe P2 connected to the fuel tank are respectively connected to the first connecting part 13a and the second connecting part 13b by press-fitting.

Figure 4:
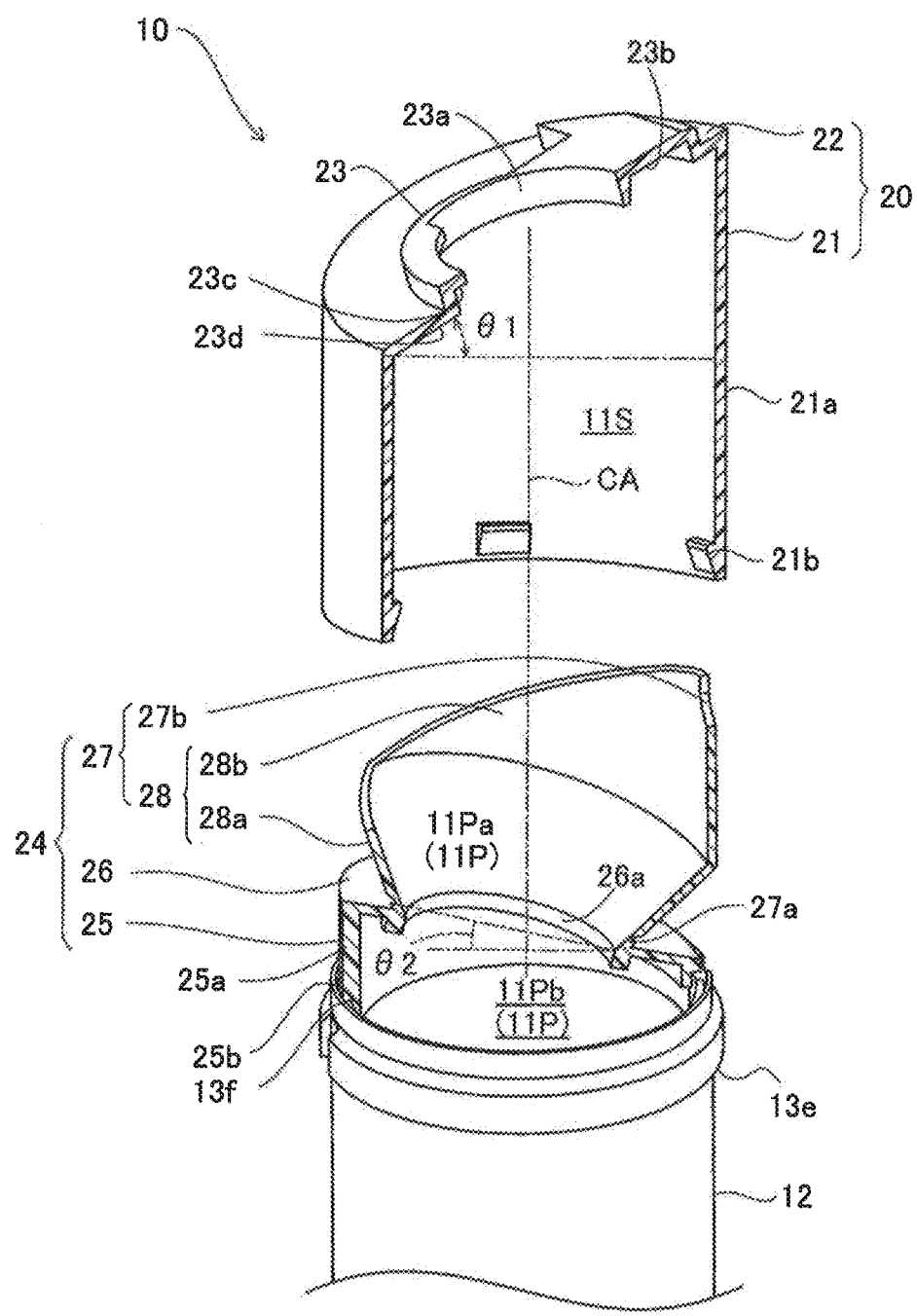
FIG. 4 is a partially fractured and exploded perspective view of the tank opening forming member.
Figure 5:
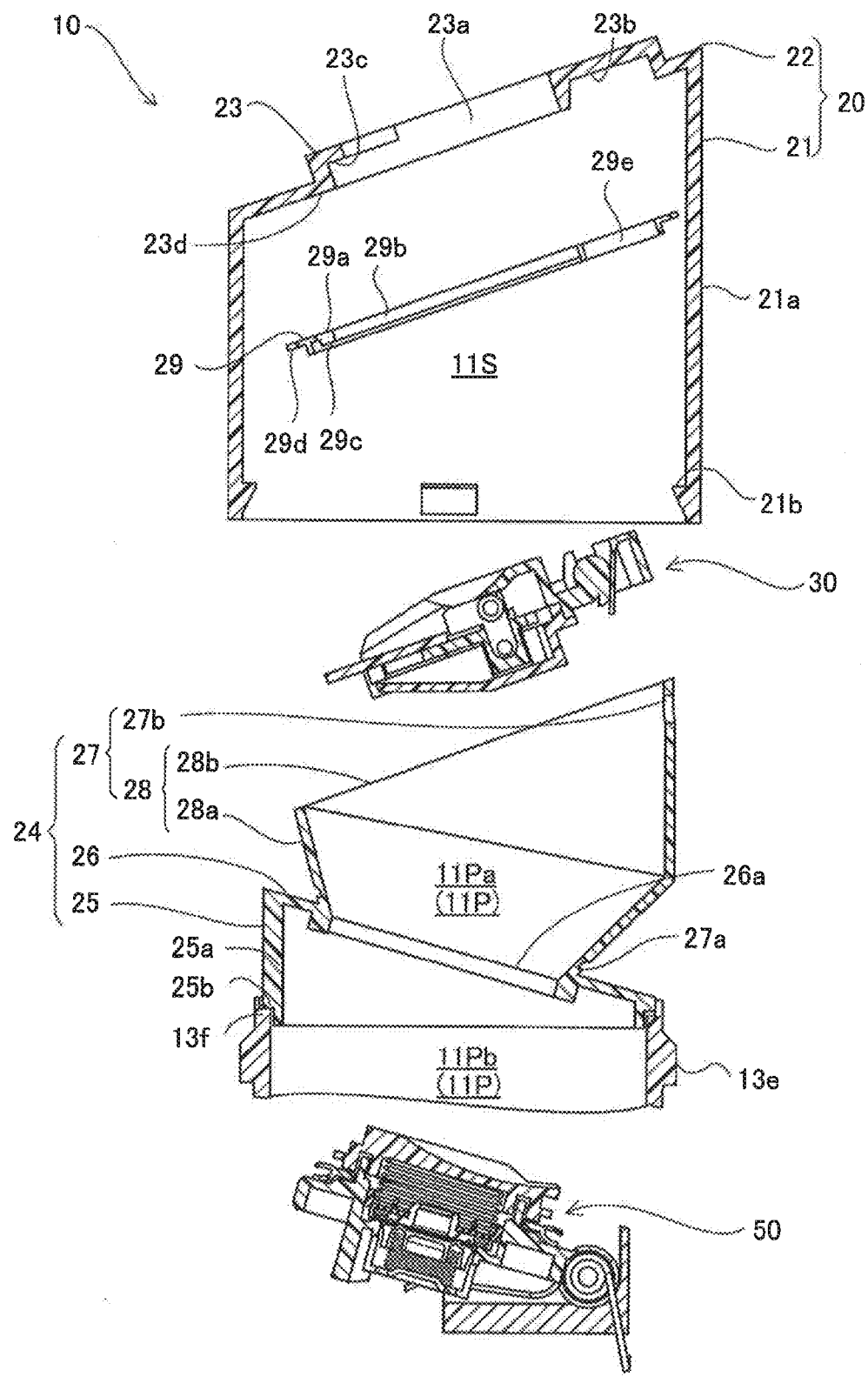
FIG. 5 is a partially exploded cross section view of the fuel tank opening-closing device.

FIG. 4 is a partially fractured and exploded perspective view of the tank opening forming member 11, and FIG. 5 is an exploded cross section view of the tank opening forming member 11. The cover member 20 is mounted on the top part of the pipe main body 12 and is equipped with a cylindrical shaped side wall 21, and a first opening forming member 22. The side wall 21 is equipped with a cylindrical shaped side main wall 21a, the top of that is tilted, and the first opening forming member 22 is formed as an integral unit on that tilted top part. The first opening forming member 22 has the axis passing through almost the center of the fuel passage 11P as the center axis CA, and is disposed tilted by a first angle θ1 to the surface perpendicular to the center axis CA. Here, the center axis CA is not limited to being the center line when the fuel passage 11P is a cross section circle shape, but also includes a case of being the line that passes through almost the center of the passage, or a case of being almost the center line of a passage for which the fuel passage 11P is curved. The first opening forming member 22 is equipped with an opening part 23 for inserting the fueling nozzle FN. The opening part 23 is equipped with a first opening 23a, a shaft support member 23b, and a nozzle latch 23c. The first opening 23a is almost circular for inserting the fueling nozzle FN, constitutes a portion of the fuel passage 11P, and is formed to be narrower than the passage surface area of the fuel passage 11P. The shaft support part 23b is formed at the end part of the first opening 23a, and is a recess for mounting and supporting the end part of the first flap valve mechanism 30. The nozzle latch 23c is a step part for catching the fueling nozzle FN positioning part FNa and holding the fueling nozzle FN during fueling. The cover member 20 is mounted on the pipe main body 12 by the engaging means of the engaging claw 21b on the bottom part of the side wall 21 and the engaging protrusion 13e of the top part of the pipe main body 12.

The passage forming member 24 is disposed within the valve connecting chamber 11S, is a member that segments the fuel passage 1P into an insertion passage 11Pa and a tank side passage section 11Pb which is a passage on the fuel tank side, is equipped with a seat member 25, a second opening forming member 26, and an insertion passage forming member 27, and is a member for which these are formed integrally as a single unit. The seat member 25 is equipped with a cylinder shaped seat main body 25a for which the top part is tilted, and a weld fixing member 25b on the bottom part of the seat main body 25a, and by having the weld fixing member 25b heat welded to the top end part 13f of the pipe main body 12, it is formed as an integral unit with the pipe main body 12. The second opening forming member 26 is further to the fuel tank side than the first opening forming member 22, and if we assume a surface perpendicular to the center axis CA of the fuel passage 11P, is disposed tilted by a second angle θ2 in relation to that perpendicular surface. The second opening forming member 26 is equipped with a second opening 26a. The second opening 26a is an almost circular passage for inserting the fueling nozzle FN, constituting a portion of the fuel passage 11P, and is formed to be narrower than the passage surface area of the fuel passage 11P.

The insertion passage forming member 27 is a member that guides the fueling nozzle FN inserted in the fuel passage 111P, and connects the first opening 23a of the first opening forming member 22 and the second opening 26a of the second opening forming member 26, and is equipped with a passage forming main body 28 which uses a portion of the fuel passage 11P as the insertion passage 11Pa. The passage forming main body 28 is equipped with an inclined wall 28a and a connecting half cylinder 28b. The inclined wall 28a is a cone shape which has the passage surface area narrower toward the second opening 26a, in other words, is tilted so that fuel that has entered the insertion passage 11Pa will flow quickly toward the second opening 26a. Also, the connecting half cylinder 28b is formed as an integral unit with the top end of the inclined wall 28a, and has a shape for which the cylinder is cut at a diagonal to connect to the inclined first opening forming member 22. Also, at the connecting site with the second opening forming member 26 which is the bottom part of the insertion path forming member 27, a fragile portion 27a is formed along the entire circumference in the circumference direction. The fragile portion 27a is a site for which part of the insertion passage forming member 27 is formed to be thin so that when external force of a specified level or greater is applied to the insertion passage forming member 27, it will break before a portion of the second opening forming member 26 breaks.

The insertion passage 11Pa within the insertion passage forming member 27 is connected to the outside via the outer vent 11Pc provided between the cover member 20 and the insertion passage forming member 27, and a portion of this is sealed in relation to the outside, but these constitutions will be described later.

(2)-2 First Flap Valve Mechanism 30

Figure 6:
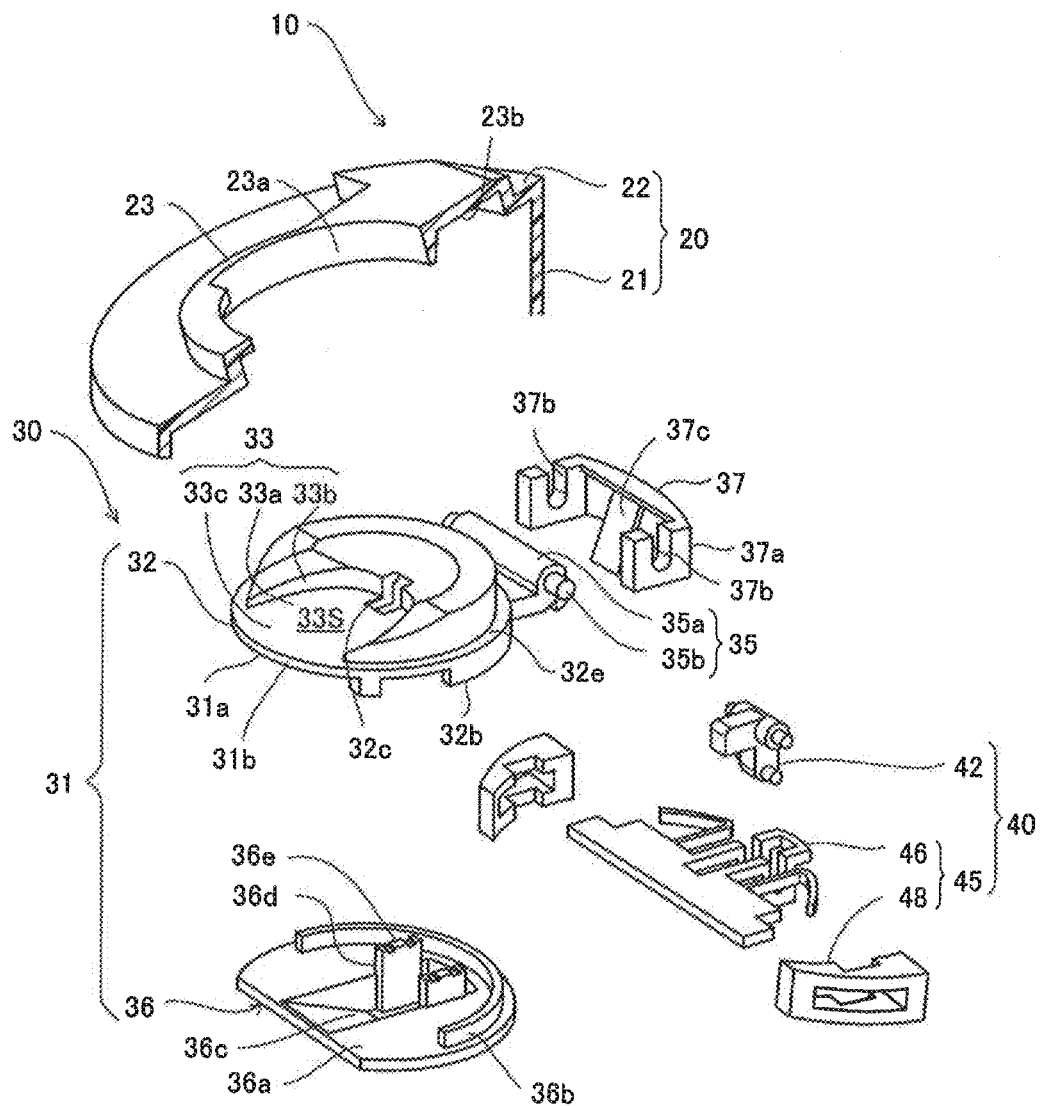
FIG. 6 is an exploded perspective view of the first flap valve mechanism of the fuel tank opening-closing device.

FIG. 6 is an exploded perspective view of the first flap valve mechanism 30 of the fuel tank opening-closing device 10. The first flap valve mechanism 30 is a mechanism which works in conjunction with insertion of the fueling nozzle for opening and closing the first opening 23a, and is fixed to the cover member 20. The first flap valve mechanism 30 is equipped with a first opening-closing member 31, a first bearing member 37, and an opening-closing activation member 40. The first opening-closing member 31 is equipped with a pressing member 32 for opening and closing the first opening 23a and a bottom lid 36.

Figure 7:
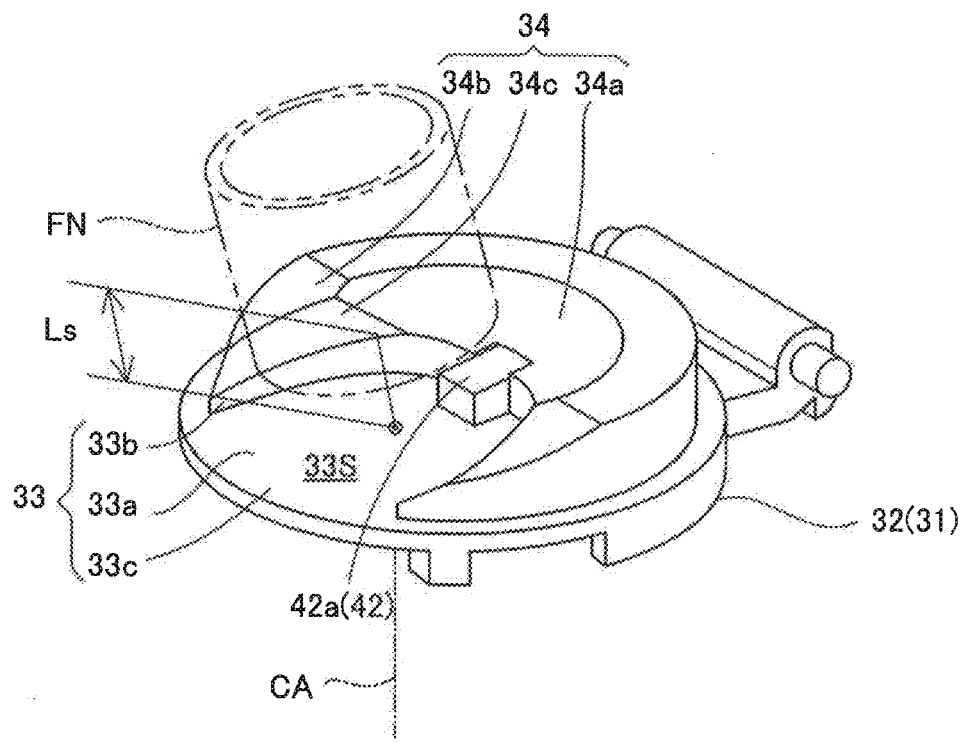
FIG. 7 is a perspective view showing the pressing member of the first opening-closing member.
Figure 8:
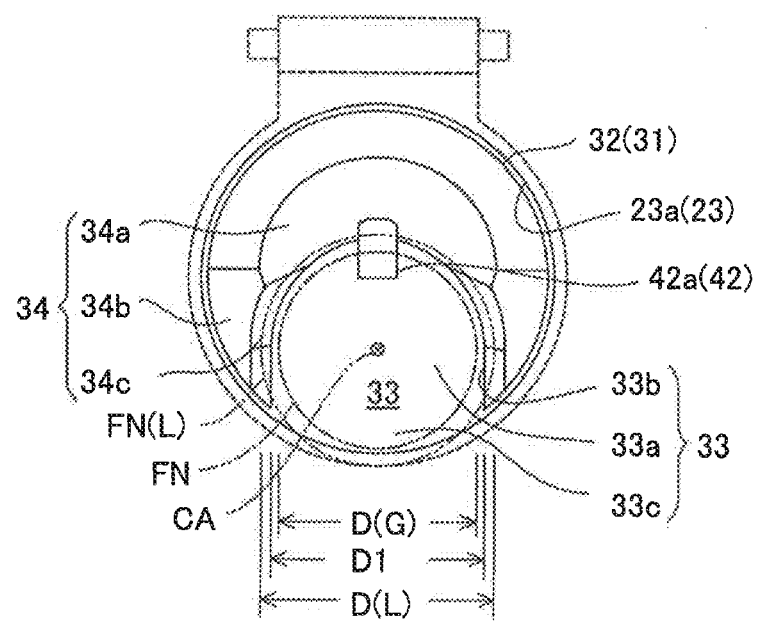
FIG. 8 is a plan view describing the pressing member of the first opening-closing member.

FIG. 7 is a perspective view showing the pressing member 32, and FIG. 8 is a plan view for describing the pressing member 32. The pressing member 32 is equipped with a pressing part 33, a guide part 34, and a first shaft 35. The pressing part 33 is equipped with a push face 33a pressed by a fueling nozzle FN of a designated outer diameter, a restriction wall 33b established along the outer edge of the push face 33a and so as to enclose in a U shape at least a portion of the push face 33a, and a flat part 33c of the free end side which does not have a restriction wall 33b. The restriction wall 33b forms a restriction region 33S restricted by almost the same inner diameter as the outer diameter of the fueling nozzle FN. As shown in FIG. 8, with D (G) as the outer diameter of the gasoline fueling nozzle FN, and D (L) as the outer diameter of the light oil fueling nozzle FN (L), the inner diameter D1 of the restriction region 33S is set to be D (G)<D1<D (L). The guide part 34 is equipped with a first guide inclined face 34a, a second guide inclined face 34b, and a third guide inclined face 34c tilted toward the top part of the restriction wall 33b, this is enclosed by a U shape for which a guide inclined face is not provided only at a portion of the pressing part 33 which is the side opposite the first shaft 35, and is an inclined face that guides the tip of the fueling nozzle FN to the restriction region 33S.

In FIG. 6, the first shaft 35 is equipped with a shaft base 35a provided projecting from the end part of the pressing member 32, and a shaft main body 35b provided projecting at both sides of the shaft base 35a. A bottom lid 36 is a member disposed at the bottom part of the pressing member 32, and is equipped with a round disk shaped lid main body 36a with a notch in one end part, and a positioning arc portion 36b provided projecting along the outer circumference part of the bottom lid 36. By the positioning arc portion 36b engaging with the fitting are portion 32b of the pressing member 32, a housing chamber 31S is formed by the pressing member 32 and the bottom lid 36 (see FIG. 5). A portion of the parts of the opening-closing activation mechanism 40 is housed in the housing chamber 31S. The first bearing member 37 is a member that supports the first opening-closing member 31 to be able to open and close by being mounted on the shaft support member 23b of the opening part 23, and is equipped with a support base 37a, a bearing hole 37b formed at both sides of the support base 37a, and a spring piece 37c. The bearing hole 37b supports the first opening-closing member 31 to be able to be opened and closed by engaging with the shaft main body 35b of the first shaft 35. The spring piece 37c is formed by a cantilever piece provided projecting from the top end of the support base 37a, and the first opening-closing member 31 is energized in the valve closed direction by pressing the shaft base 35a of the first shaft 35.

Figure 9:
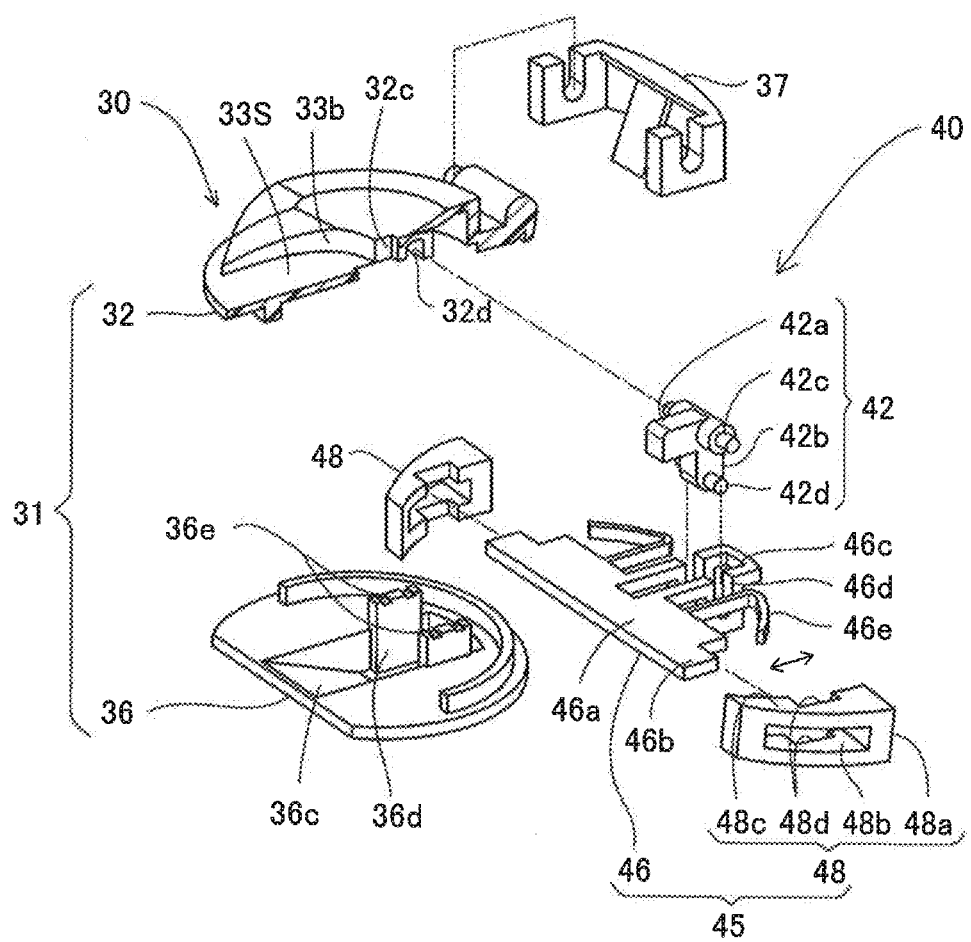
FIG. 9 is a partially fractured and exploded perspective view of the opening-closing activation mechanism.

FIG. 9 is an exploded perspective view of the opening-closing activation mechanism 40. The opening-closing activation mechanism 40 is a mechanism that releases the locked position of the first opening-closing member 31 of the first flap valve mechanism 30 by being pressed by the tip of a fueling nozzle of a designated outer diameter, and is equipped with a nozzle detection member 42 and a locking mechanism 45. The nozzle detection member 42 is equipped with a detection part 42a, a connecting part 42b formed in an L shape together with the detection part 42a, a shaft 42c, and a joint pin 42d provided projecting from the shaft 42c. The detection part 42a is a part pressed by the tip of the fueling nozzle FN, and is exposed toward the restriction region 33S from the mounting hole 32c formed in the restriction wall 33b of the pressing member 32. The shaft 42c is supported to be able to rock by being gripped by the support part 32d of the bottom part of the pressing member 32 and the support part 36e of the support projection piece 36d provided projecting from the recess 36c of the bottom lid 36.

The locking mechanism 45 is a mechanism that works in conjunction with the nozzle detection member 42, and is equipped with a locking member 46 and a locked part 48. The locking member 46 is equipped with a plate shaped locking main body 46a, a lock engaging part 46b, a pin connection 46c, a connection groove 46d, and a spring piece 46e. The lock engaging part 46b is formed at both sides of the locking main body 46a, and is a part that engages and disengages with the locked part 48. The pin connection 46c is a cantilever piece provided projecting from one end of the locking main body 46a, and forms the connection groove 46d. The connection groove 46d has the joint pin 42d of the nozzle detection member 42 fit into it. The spring piece 46e is a member for energizing return force on the locking member 46. Locked parts 48 are disposed at both sides of the locking member 46, and are equipped with a locked main body 48a, and an insertion hole 48b in which the lock engaging part 46b of the locking member 46 formed on the locked main body 48a is inserted. Also, on the locked main body 48a, formed are the locked part 48c and the disengagement hole 48d that switch between the locked position and the unlocked position by the locking member 46 inserted in the insertion hole 48b being moved in the arrow direction.

Figure 10A:
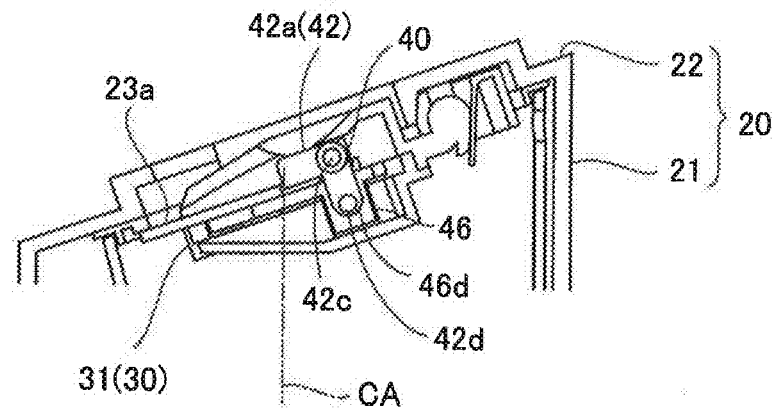
FIG. 10A and FIG. 10B show the first flap valve mechanism.
Figure 10B:
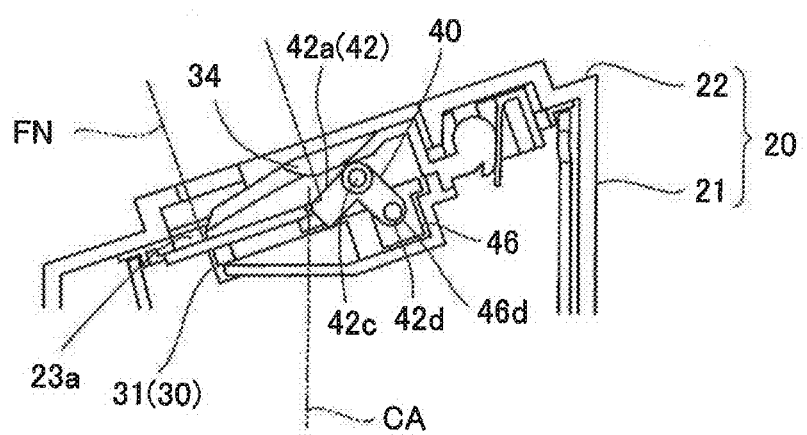
Figure 11A:
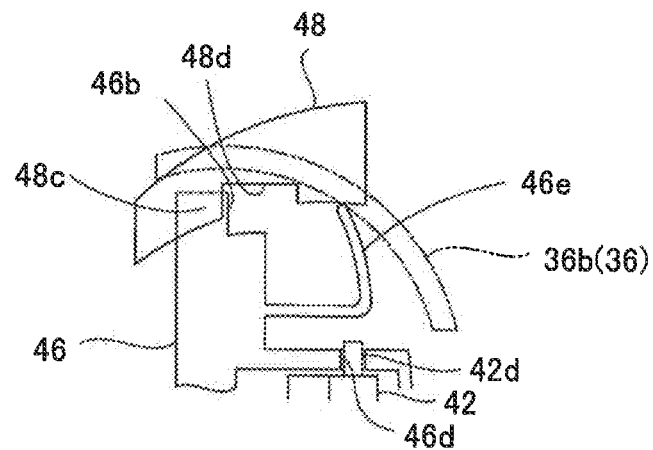
FIG. 11A and FIG. 11B show the movement of the locking member.
Figure 11B:
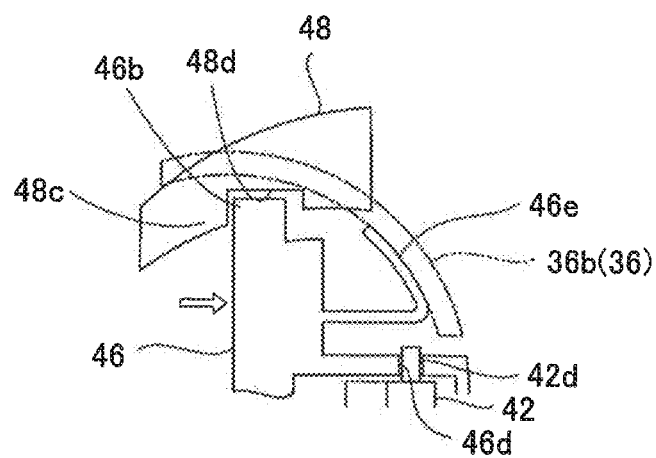

The operation of the opening-closing activation mechanism 40 is described using FIG. 10A, FIG. 10B, FIG. 11A, and FIG. 11B. FIG. 10 is an explanatory drawing for describing the first flap valve mechanism 30, and FIG. 11A and FIG. 11B are explanatory drawings for describing the movement of the locking member 46. FIG. 10A and FIG. 11A show the locked position of the opening-closing activation mechanism 40, and FIG. 10B and FIG. 11B show the unlocked position of the opening-closing activation mechanism 40. In FIG. 10A, when the detection part 42a of the nozzle detection member 42 exposed from the top surface of the first opening-closing member 31 is pressed by the tip of the fueling nozzle FN, as shown in FIG. 10B, the nozzle detection member 42 rotates with the shaft 42c at the center. The joint pin 42d of the nozzle detection member 42 is fit into the connection groove 46d of the locking member 46, so as shown in from FIG. 11A to FIG. 11B, the locking member 46 works in conjunction with the nozzle detection member 42 and moves in the arrow direction. At this time, the spring piece 46e of the locking member 46 is in contact with the positioning are portion 36b of the bottom lid 36, so the locking member 46 moves in the arrow direction with spring force generated while being warped. Then, by moving the lock engaging part 46b of the locking member 46 from the state engaged in the locked part 48c of the locked part 48 to the disengagement hole 48d, this switches from the locked position to the unlocked position, in other words, the locked position of the opening-closing activation mechanism 40 is released, and the opening operation of the first opening-closing member 31 becomes possible.

(2)-3 Second Flap Valve Mechanism 50

Figure 12:
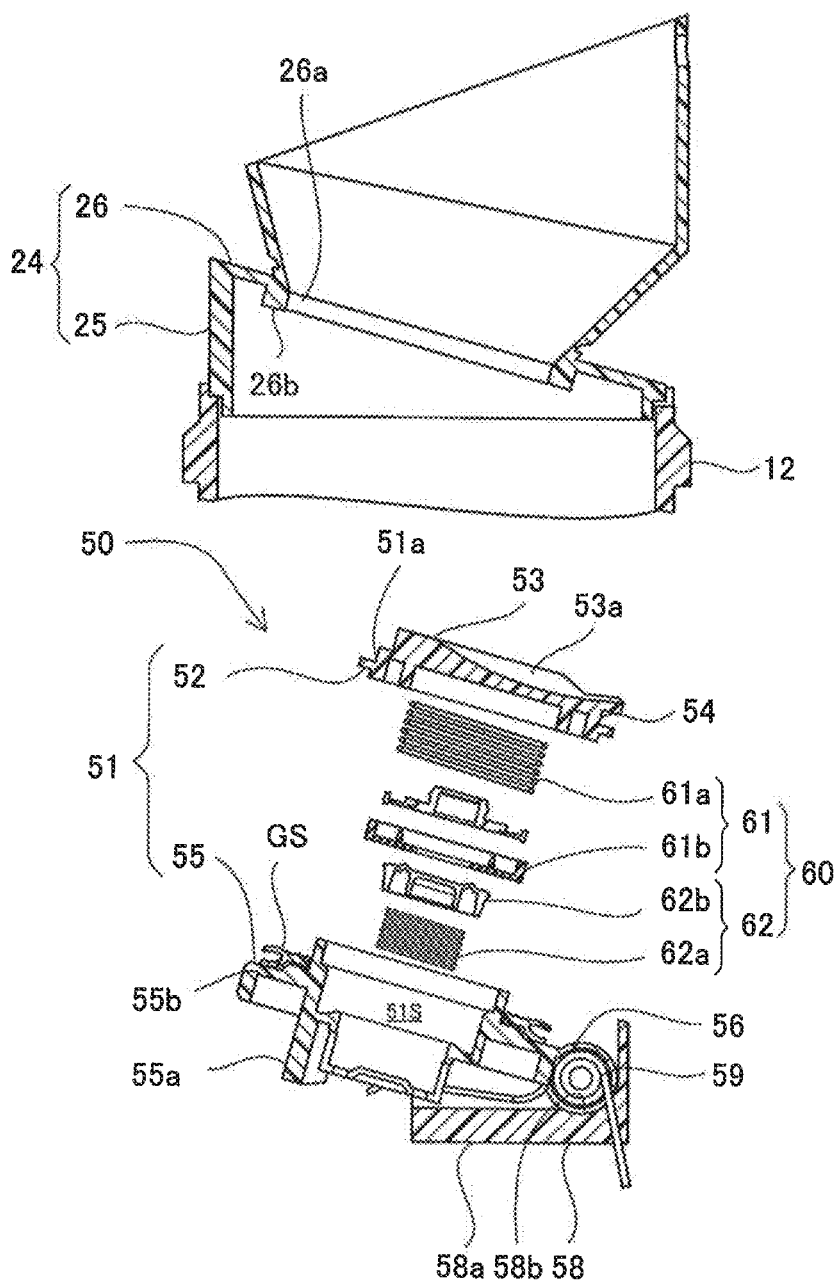
FIG. 12 is an exploded cross section diagram of the second flap valve mechanism.

FIG. 12 is an exploded cross section diagram of the second flap valve mechanism 50. The second flap valve mechanism 50 is a mechanism for opening and closing the second opening 26a, and is equipped with a second opening-closing member 51, a second bearing 58, a spring 59, a gasket GS, and a pressure regulating valve 60.

Figure 13A:
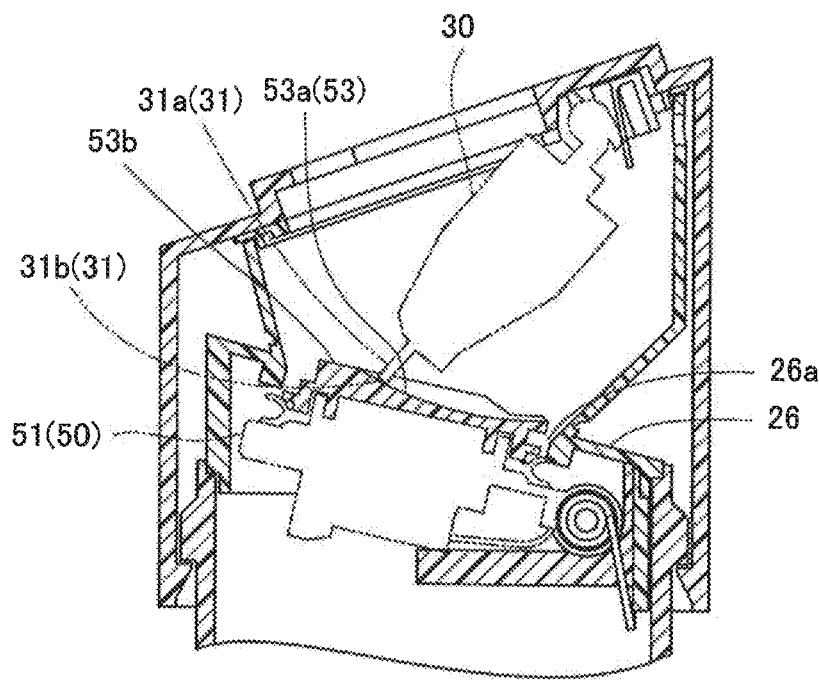
FIG. 13A and FIG. 13B show the operation of the first and second flap valve mechanisms and the shape of the second opening-closing member.

The second opening-closing member 51 is equipped with a pressing member 52, a valve chamber defining member 55, and a second shaft 56 formed on the end part of the valve chamber defining member 55. The pressing member 52 is equipped with a top surface part 53 pressed by the fueling nozzle FN, and a side wall 54 provided projecting from the outer circumference of the top surface part 53, and is formed in a plate shape that opens downward. A sliding surface 53a is formed on the top surface part 53. As shown in FIG. 13A, the sliding surface 53a is the surface on which the end part of the first opening-closing member 31 slides. Specifically, when the opening operation of the first opening-closing member 31 of the first flap valve mechanism 30 is done, the sliding surface 53a is pressed by the sliding end 31b formed on the free end 31a of the first opening-closing member 31, and is formed in a curved surface that slides while in line contact. As shown by the plan view of the second opening-closing member 51 in FIG. 13B, the direction from the second shaft 56 of the second opening-closing member 51 facing the free end 51a of the second opening-closing member 51 is the first direction X, and the direction perpendicular to that first direction X is the second direction Y. The second opening-closing member 51 has a step 53b provided on the free end 51a side, and the end part of the sliding surface 53a is formed from that step 53b. Also, the sliding surface 53a is formed so that the contact surface area with the sliding end 31b in the second direction Y decreases as it goes from the center of the second opening-closing member 51 toward the first direction X, and is formed so as to have line contact in the second direction Y with the sliding end 31b being an oval shaped curved surface that is concave in the plate thickness direction.

In FIG. 12, the valve chamber defining member 55 has a cup shape, and forms a valve chamber 51S which houses the pressure regulating valve 60 by being joined with the pressing member 52. A flange 55b is formed on the outer circumference part of the valve chamber defining member 55. The gasket GS is formed from a rubber material, this is held by being gripped between the top surface of the inner circumference side of the flange 55b and the outer circumference opening circumference edge part of the pressing member 52, and the second opening 26a is sealed by being compressed with the sealing step 26b of the second opening forming member 26.

The second bearing 58 is equipped with a support main body 58a mounted on the inner wall of the pipe main body 12, and a bearing hole 58b formed on the support main body 58a, and by giving axial support to the second shaft 56 of the second opening-closing member 51 using the bearing hole 58b, the second opening-closing member 51 is rotatably supported. The spring 59 is a coil spring, one end of that coil shape is supported on, the second bearing 58, and the other end part is supported at the bottom surface of the second opening-closing member 51 and is energized in the closing direction of the second opening-closing member 51. By the second bearing 58 axially supporting the second opening-closing member 51, the second opening-closing member 51 does an opening-closing operation so that the free end 51a moves with the second shaft 56 as the fulcrum.

The pressure regulating valve 60 is housed inside the valve chamber 51S, is equipped with a positive pressure valve 61 having a positive pressure valve body 61b energized by the spring 61a, and a negative pressure valve 62 having a negative pressure valve body 62b energized by the spring 62a, and the fuel tank pressure is adjusted so that the tank internal pressure of the fuel tank is within a specified range by opening and closing both valves.

(2)-4 Vent Passage and Sealing Mechanism

Figure 14:
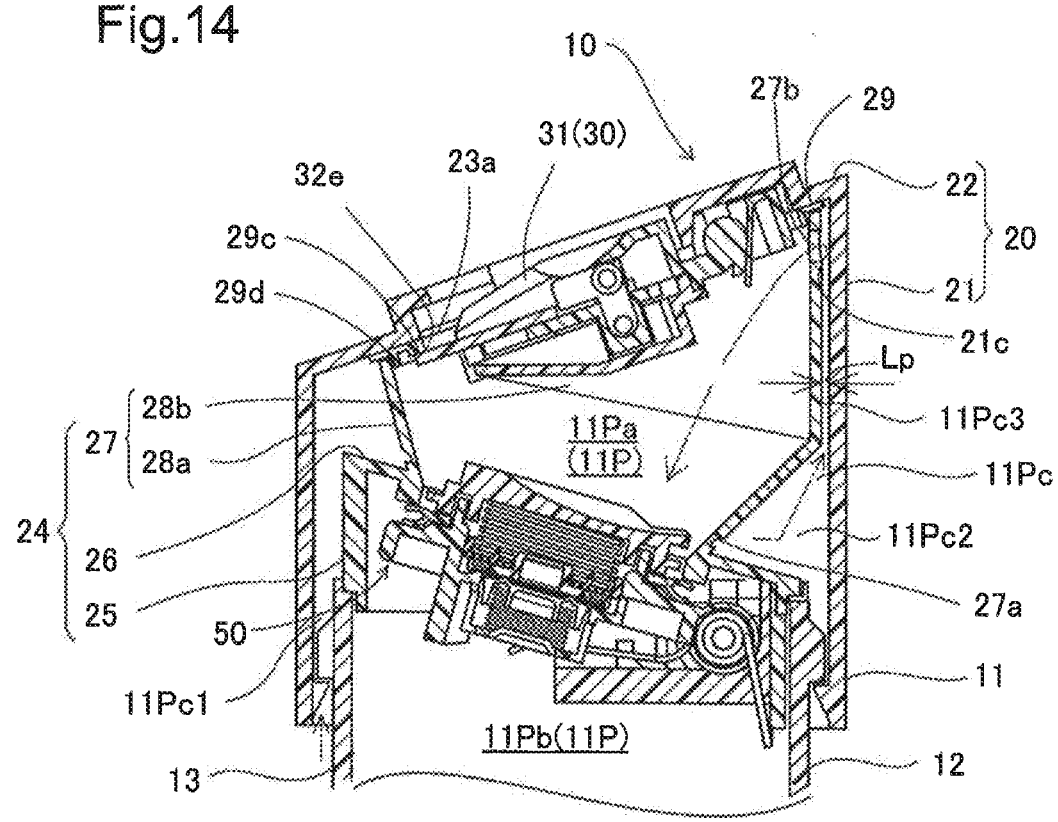
FIG. 14 is a cross section diagram showing the top part of the fuel tank opening-closing device.
Figure 15:
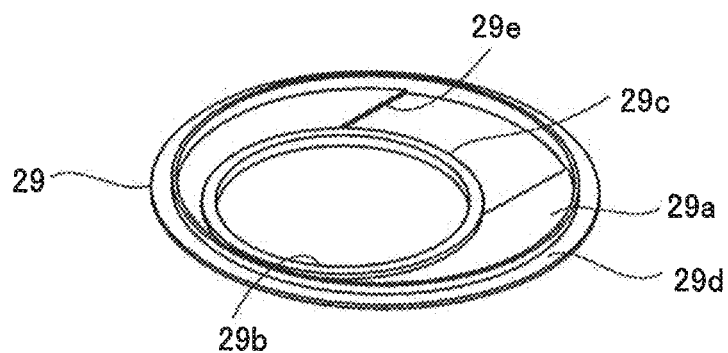
FIG. 15 is a perspective view of the sealing member seen from the back surface side.

FIG. 14 is a cross section diagram showing the top part of the fuel tank opening-closing device 10. As described above, the space enclosed by the insertion passage forming member 27 and the first opening-closing member 31 is formed in the insertion passage 11Pa. The insertion passage 11Pa does not have a high level of air tightness compared to the tank side passage 11Pb, but in addition to ensuring ventilation to the outside, it also has sealing properties to prevent dust and the like. Specifically, arranged is a sealing member 29 disposed at the opening circumference edge part of the first opening 23a of the first opening forming member 22 and the first opening 23a side of the insertion passage forming member 27. FIG. 15 is a perspective view of the sealing member 29 seen from the back surface side (side from under the drawing). The sealing member 29 is formed in a circle from a sealing material, and is equipped with a seal main body 29a, an opening 29b with almost the same diameter as the first opening 23a, a first seal part 29c, a second seal part 29d, and an attachment opening 29e. The first seal part 29c is an opening circumference edge of the first opening 23a, and is a part pressed by the seal surface 32e of the outer circumference part of the first opening-closing member 31. The second seal part 29d is a part that is more to the outer periphery than the first seal part 29c, and is gripped by the opening peripheral part 23d of the first opening forming member 22 and the insertion passage forming member 27. The sealing member 29 seals the insertion passage 11Pa enclosed by the first opening forming member 22, the first opening-closing member 31, and the insertion passage forming member 27.

Also, the outer vent 11Pc is formed by the space and gaps enclosed by the cover member 20 side wall 21, the insertion passage forming member 27, the second opening forming member 26, the seat member 25, and the cylindrical portion 13. The vent hole 27b is formed on the top part of the insertion passage forming member 27. Also, the vent forming member 21c constituting a portion of the side wall 21 is arranged separated by a designated gap Lp facing the vent hole 27b. The outer vent 11Pc is connected by a maze structure with the outside and the insertion passage 11Pa through the gap passage 11Pc1 between the side wall 21 and the pipe main body 12, the annular passage 11Pc2 between the side wall 21, the seat member 25, and the second opening forming member 26, and the gap passage 11Pc3 between the side wall 21 and the insertion passage forming member 27 connecting half cylinder 28b.

(3) Opening and Closing Operation of the Fuel Tank Opening-Closing Device 10

Next, we will describe the fueling operation to the fuel tank opening-closing device 10 by the fueling nozzle FN.

(3)-1 Opening Operation

Figure 16:
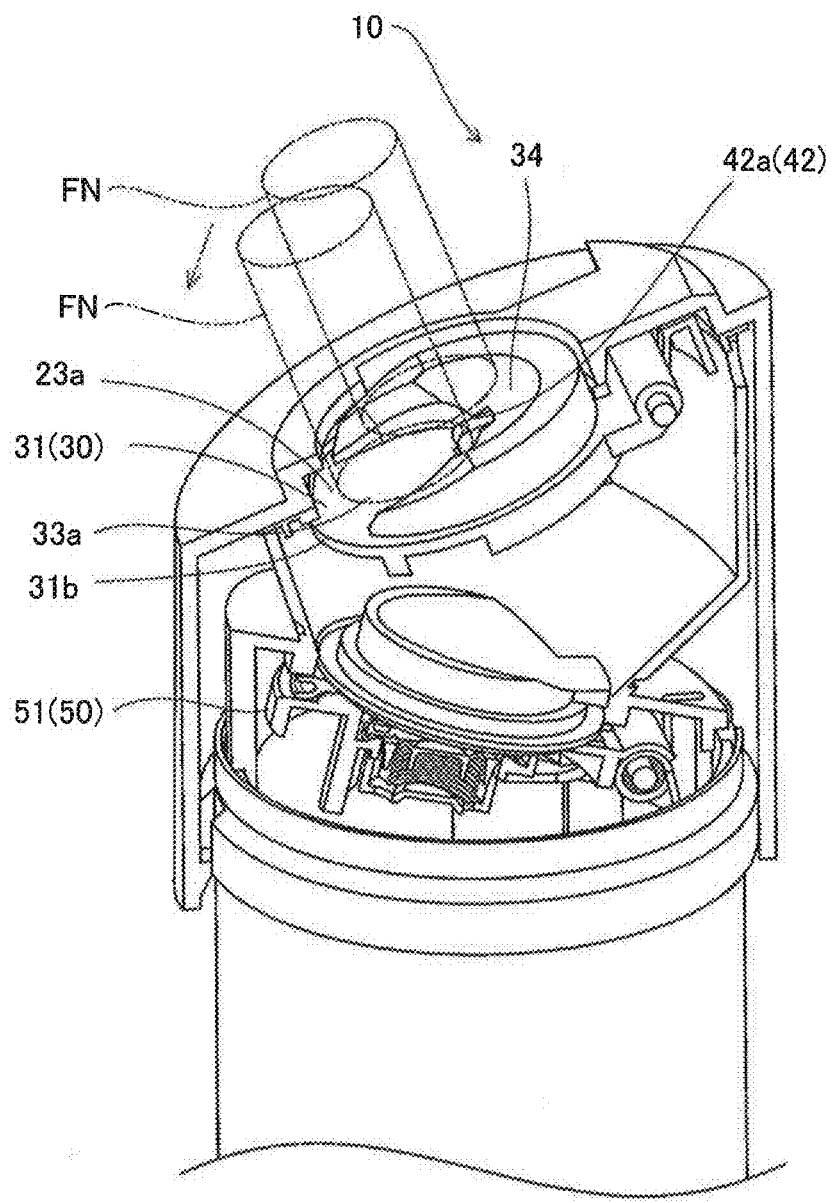
FIG. 16 shows the fueling operation of the fuel tank opening-closing device.

As shown in FIG. 1, when the fueling lid FL is opened, the fuel tank opening-closing device 10 disposed inside the fueling bay FR appears. As shown in FIG. 16, when the fueling nozzle FN is inserted in the first opening 23a and the tip of the fueling nozzle FN does not contact the push face 33a of the first opening-closing member 31, as shown in FIG. 7, it is guided by the guide part 34 first guide inclined face 34a, the second guide inclined face 34b, and the third guide inclined face 34c, and facing the push face 33a, is positioned by the restriction wall 33b set up from the push face 33a. The detection part 42a of the nozzle detection member 42 is projecting at part of the wall surface enclosing the push face 33a, so the tip of the fueling nozzle FN contacts the detection part 42a. As a result, as shown in FIG. 10A, FIG. 10B, FIG. 11A, and FIG. 11B, when the detection part 42a of the nozzle detection member 42 is pressed by the tip of the fueling nozzle FN, the locking member 46 switches from the locked position to the unlocked position, in other words, the locked position of the opening-closing activation mechanism 40 is released, and it is possible to do the opening operation of the first opening-closing member 31.

Figure 17:
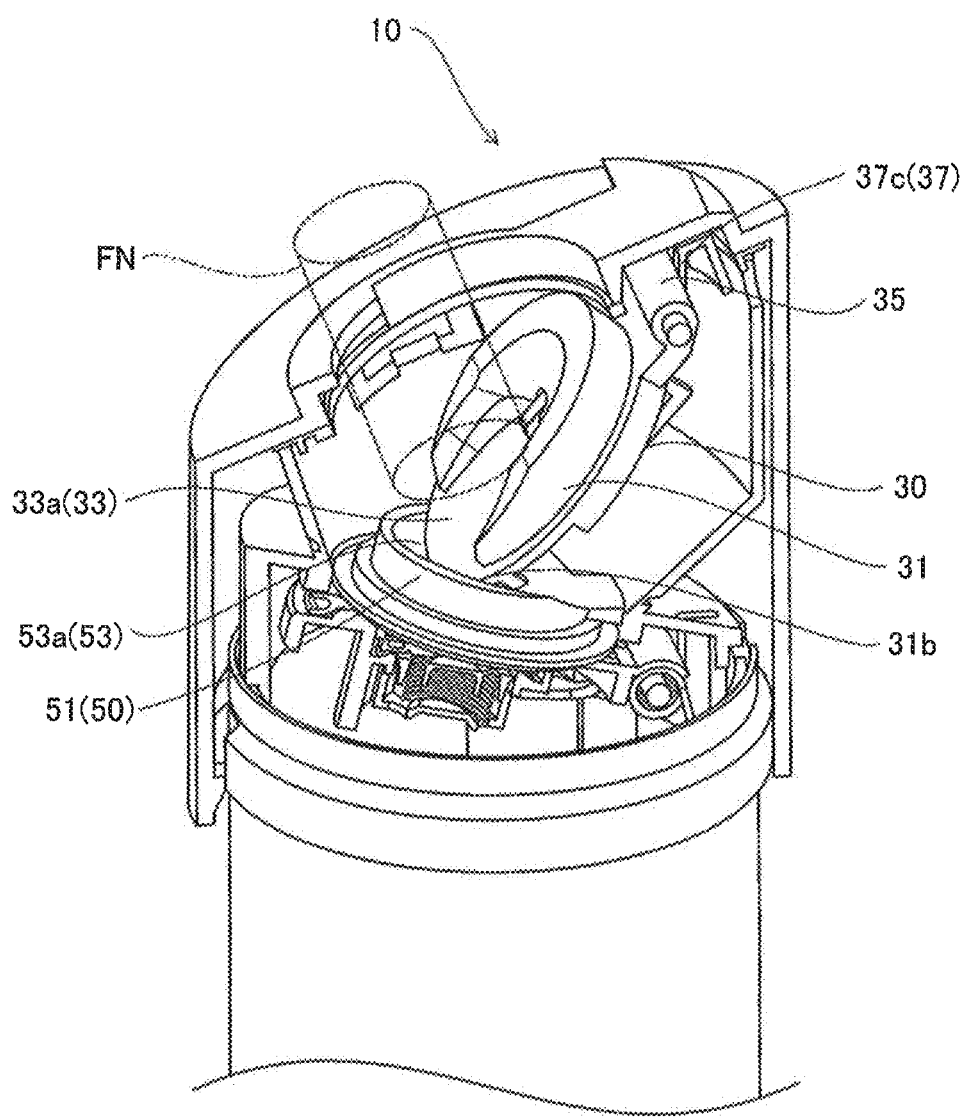
FIG. 17 shows the operation continuing from FIG. 16.
Figure 18:
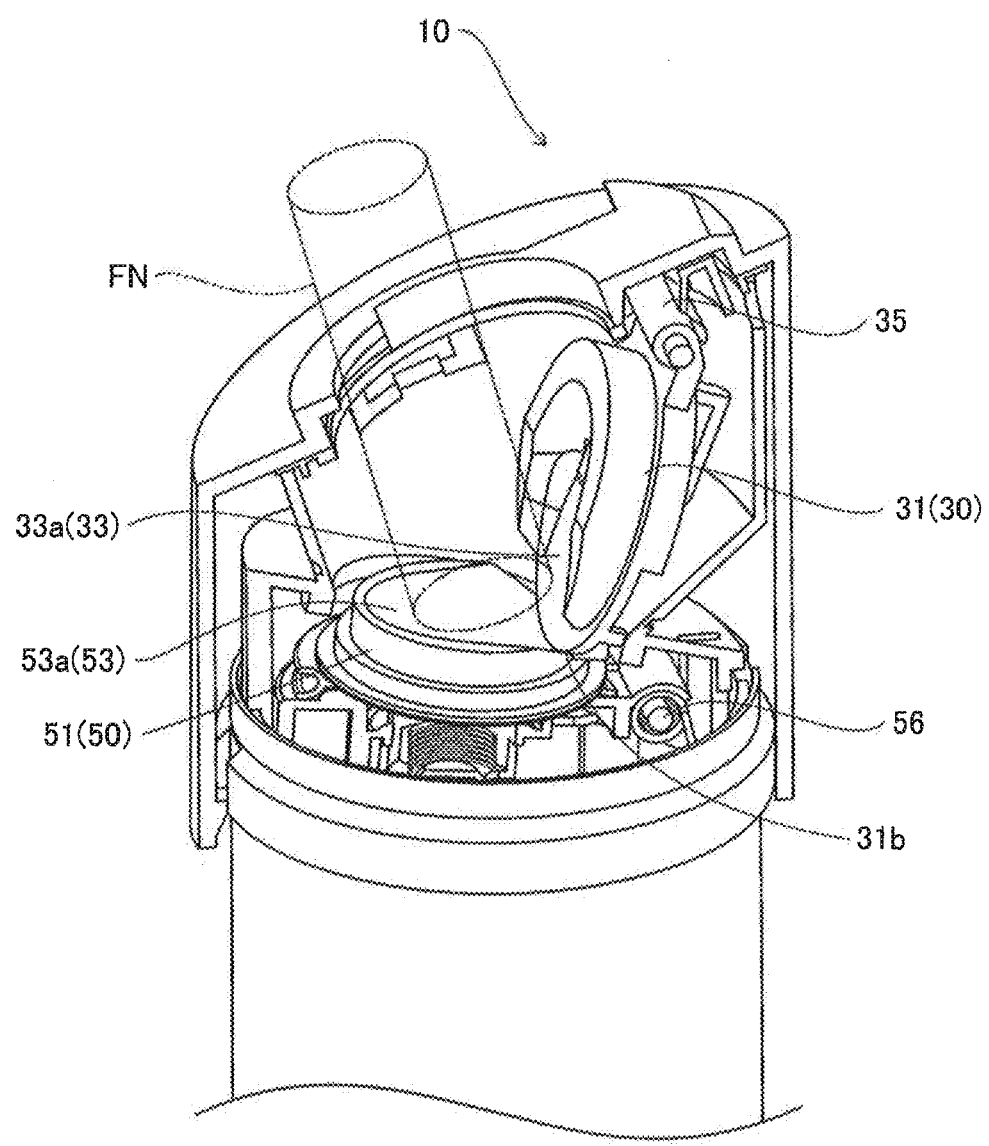
FIG. 18 shows the operation continuing from FIG. 17.
Figure 19:
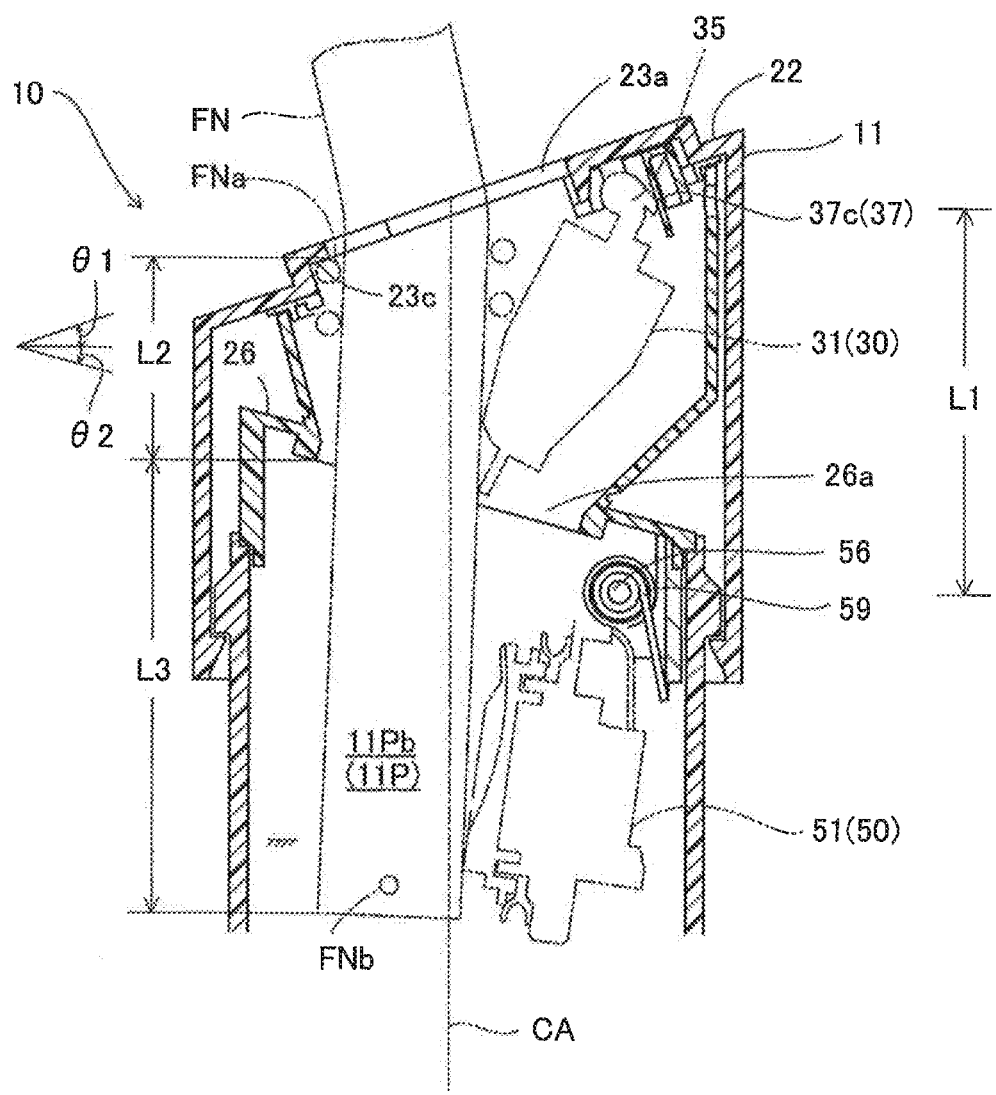
FIG. 19 shows the operation continuing from FIG. 18.

Then, as shown in FIG. 17, when the fueling nozzle FN is further inserted, and the tip of the fueling nozzle FN presses the push face 33a of the pressing part 33 of the first opening-closing member 31, the first opening-closing member 31 rotates against the energizing force of the spring piece 37c of the first bearing 37. At this time, as shown in FIG. 17 and FIG. 18, when the fueling nozzle FN is further inserted, the tip of the fueling nozzle FN contacts the sliding surface 53a of the second opening-closing member 51, and the second opening-closing member 51 rotates with the second shaft 56 at the center. As a result, the fueling nozzle FN is inserted into the tank side passage 11Pb. Then, as shown in FIG. 19, with the fueling nozzle FN, the positioning part FNa catches on the nozzle latch 23c to be held in the tank opening forming member 11, and in this state, fueling is done from the fueling nozzle FN to the tank side passage 11Pb. The fuel exceeds the full tank fluid level of the fuel tank and the fuel within the tank side passage 11Pb rises. Then, when the fuel enters the detection hole FNb near the tip of the fueling nozzle FN, the auto stop of the fueling nozzle FN operates, and fueling is stopped.

(3)-2 Closing Operation

When fueling ends, and the fueling nozzle FN is extracted from the second opening 26a, the second opening-closing member 51 of the second flap valve mechanism 50 is rotated by the restoration force of the spring 59 and the second opening 26a is closed, and when the fueling nozzle FN is further extracted, the first opening-closing member 31 of the first flap valve mechanism 30 is rotated by the restoration force of the spring piece 37c, and the first opening 23a is closed. As shown in FIG. 10A, FIG. 10B, FIG. 11A, and FIG. 11B, the locking member 46 and the nozzle detection member 42 return to their initial positions, in other words, by the elastic force of the positioning are portion 36b of the bottom lid 36, the lock engaging part 46b of the locking member 46 is engaged with the locked part 48c of the locked part 48, and the nozzle detection member 42 returns to its initial position. Furthermore, the fueling lid FL (FIG. 1) is closed.

(4) Operation and Effect of the Fuel Tank Opening-Closing Device 10

The following operation and effects are exhibited by the fuel tank opening-closing device 10 of the embodiment noted above.

(4)-1. As shown in FIG. 7, with the opening-closing activation mechanism 40, when the fueling nozzle FN is inserted in a state with the position skewed by an amount of the distance Ls from the center axis CA in the first opening 23a, the tip of the fueling nozzle FN contacts the guide part 34, and is guided by the restriction region 33S enclosed by the wall surface of the pressing part 33. The tip of the fueling nozzle FN pushes the detection part 42a, the locking mechanism 45 shown in FIG. 11B is moved to the unlocked position, and it is possible to do the opening operation of the first opening-closing member 31 of the first flap valve mechanism 30. Therefore, even when the fueling nozzle FN is inserted skewed from the center axis CA of the first opening 23a, it is possible to reliably perform the opening operation of the flap valve mechanism.

(4)-2 As shown in FIG. 8, the first opening-closing member 31 guide part 34 and the nozzle detection member 42 are disposed so as to be pressed by the tip of the fueling nozzle FN when the outer diameter of the tip of the fueling nozzle FN is of a designated diameter or less, so in the case of a gasoline fueling nozzle FN, the first opening-closing member 31 performs the opening operation, but in the case of a light oil fueling nozzle FN, the first opening-closing member 31 does not perform the opening operation. Specifically, with the outer diameter of the gasoline fueling nozzle FN as D (G), the inner diameter of the restriction region 33S as D1, and the outer diameter of the light oil fueling nozzle FN (L) as (D) L, D (G)<D1<D (L). Thus, even when an attempt is made for the tip of the outer diameter D (L) light oil fueling nozzle FN (L) to press the detection part 42a of the nozzle detection member 42, it contacts the guide part 34 and does not enter the inner diameter D1 restriction region 33S, and does not press the detection part 42a of the nozzle detection member 42, so the unlocked position is not released. Therefore, when the type of fuel differs according to the outer diameter of the fueling nozzle FN, specifically, even when a fueling nozzle FN is inserted in error, the first opening 23a does not open, so there is no supplying of the wrong type of fuel.

(4)-3 As shown in FIG. 7, with the restriction region 33S enclosed by the restriction wall 33b of the pressing part 33, even when there is an internal diameter D1 that is only slightly larger than the outer diameter D (G) of the fueling nozzle FN, the guide part 34 tilted toward the top part of the restriction wall 33b is provided, and the guide part 34 guides the tip of the fueling nozzle FN into the restriction wall 33b, so it is possible for the work of inserting the fueling nozzle FN to be done smoothly.

(4)-4 The restriction wall 33b of the pressing part 33 is formed in a U shape having a flat part 33c opening at one side. The flat part 33c is arranged at the free end side of the side opposite to the first shaft 35 of the first opening-closing member 31, so when the first opening-closing member 31 does the opening operation with the first shaft 35 at the center, there is no problem with sliding of the tip of the fueling nozzle FN. Thus, when doing the opening operation of the first opening-closing member 31, the tip of the fueling nozzle FN does not catch on the guide part 34, and it is possible to perform a smooth operation of the first opening-closing member 31.

(4)-5 The detection part 42a of the nozzle detection member 42 is arranged projecting from the restriction wall 33b, so when the tip of the fueling nozzle FN enters the restriction region 33S, the tip of the fueling nozzle FN is more reliably pressed. Also, the restriction region 33S which is made so insertion is possible selectively by the specific external shape of the fueling nozzle is restricted by the restriction wall 33b, and it is also possible to not give the nozzle detection member 42 a function of detecting the external shape of the fueling nozzle FN. Thus, it is possible to reliably detect the type of fueling nozzle FN simply by arranging just one nozzle detection member 42.

(4)-6 The guide part 34 is provided on the first opening-closing member 31, in other words, it is not provided on the tank opening forming member 11 which can easily have the diameter become larger, so it is possible to make the outer diameter or the like of the tank opening forming member 11 small, and to make the constitution simple.

(4)-7 As shown in FIG. 3, the first flap valve mechanism 30 has the first opening 23a of the tank opening forming member 11 closed other than during fueling, so it is possible to prevent dust or the like in the air from reaching the second flap valve mechanism 50 through the first opening 23a and the insertion passage 11Pa, and to prevent a decrease in the sealing properties of the second flap valve mechanism 50.

(4)-8 As shown in FIG. 16 to FIG. 18, when the first opening-closing member 31 performs the opening operation, by the sliding end 31b provided at the free end side of the first opening-closing member 31 sliding in line contact on the sliding surface 53a of the second opening-closing member 51, dust or the like riding on the sliding surface 53a is removed from the sliding surface 53a to the second shaft 56 side. Specifically, dust or the like is removed from the sliding surface 53a which is the location that receives the pressing force from the tip of the fueling nozzle FN. Thus, the dust or the like riding on the second opening-closing member 41 can be prevented from entering the fuel tank connected to the fuel passage 11P without a drop to the fuel passage 11P of the fuel tank side due to the tilt of the second opening-closing member 51 or to dust or the like attached to the second opening-closing member 51 being scraped off by the tip of the fueling nozzle FN.

(4)-9 As shown in FIG. 17 and FIG. 18, the second opening-closing member 51 is pressed by the sliding end 31b of the first opening-closing member 31, and the force directly pressing the second opening-closing member 51 by the tip of the fueling nozzle FN is reduced, so there is little damage to the sliding area 53a, and it is possible to smoothly perform the opening operation of the second opening-closing member 51.

(4)-10 As shown in FIG. 19, with the tank opening forming member 11, the first opening forming member 22 is arranged tilted by a first angle $\theta 1$ in relation to the surface perpendicular to the center axis CA, and the second opening forming member 26 is arranged tilted by a second angle $\theta 2$ in relation to the surface perpendicular to the center axis CA, and the first opening forming member 22 and the second opening forming member 26 are arranged so as to become narrower from the first shaft 35 and the second to shaft 56 side toward the side facing opposite the fuel passage 11P in relation to the center axis CA. With this kind of constitution, in a state with the fueling nozzle FN inserted into the fuel passage 11P, and the positioning part FNa positioned at the nozzle latch 23c and fueling, with the nozzle latch 23c, the distance L2 with the free end side of the second opening 26a is shorter than the distance L1 between the first shaft 35 and the second shaft 56, and it is possible to have the tip of the fueling nozzle FN be inserted by a distance L3 up to the interior (fuel tank side) of the fuel passage 11P through the second opening 26a. Thus, by the detection hole FNb of the fueling nozzle FN detecting the fuel fluid level within the fuel passage 11P which has risen to near the tip of the fueling nozzle FN, when fueling is automatically stopped, it is possible to make the distance from the detection hole FNb of the fueling nozzle FN to the second opening 26a longer, and it is possible to have auto stop operated before the liquid surface rises to near the second opening 26a, making it possible to prevent leaking of fuel from the second opening 26a. Also, the fueling nozzle FN can be inserted to the inner depth of the second opening 26a, so it is possible to prevent the occurrence of auto stop accidentally due to splashing of fuel near the second opening 26a of the fuel passage 11P, making it possible to perform fueling work smoothly.

Here, as the aforementioned first angle $\theta 1$ and second angle $\theta 2$, with reference to parameters such as distance L1 and distance L3 which do not cause problems for the opening and closing operation of the first opening-closing member 31 of the first flap valve mechanism 30, it is preferable to have $5 \leq \theta 1, \theta 2 \leq 30°$.

(4)-11 As shown in FIG. 19, with the first opening forming member 22 and the second opening forming member 26, the distance L1 between the first shaft 35 and the second shaft 56 can be made larger, so the tip of the first opening-closing member 31 does not cause problems for the opening and closing operation of the first opening-closing member 31 such as by interfering with the second opening-closing member 51.

(4)-12 As shown in FIG. 13A, the top surface part 53 of the second opening-closing member 51 pierces through the second opening 26a, and projects from the top surface of the second opening forming member 26 to the first opening 23a side, so there is no contact by the free end 31a of the first opening-closing member 31 on the opening peripheral edge part of the second opening forming member 26, and it is possible to perform the opening and closing operation of the first opening-closing member 31 smoothly.

(4)-13 As shown in FIG. 14, the insertion passage 11Pa enclosed by the side wall 21 of the cover member 20 and the insertion passage forming member 27 and the like has its internal pressure regulated by the ensuring of venting to the outside by the outer vent 11Pc. Also, with the outer vent 11Pc, the insertion passage forming member 27 and the vent forming member 21c are arranged at a specified distance Lp, and the vent hole 27b that passes through the insertion passage 11Pa is arranged facing opposite the vent forming member 21c, and is a bent passage. Thus, dust and the like from outside is removed by the outer vent 11Pc, and it is possible to prevent it from reaching the insertion passage 11Pa, (4)-14 The vent forming member 21c constitutes a portion of the cover member 20 constituted by the side wall 21 formed as an integral unit from the outer edge of the first opening forming member 22, so there is no increase in the number of parts for providing the vent forming member 21c.

(4)-15 The insertion passage forming member 27 has an inclined wall 28a tilted so that the passage surface area of the insertion passage 11Pa becomes narrower from the first opening 23a toward the second opening 26a, so it is possible to quickly return to the inclined wall 28a fuel that leaks from the second opening 26a side to the insertion passage 11Pa.

(4)-16 As shown in FIG. 4, the insertion passage forming member 27 has a passage forming main body 28 formed in a tube shape and a fragile portion 27a for which the thickness part of the passage forming main body is made partially thinner, and the fragile portion 27a is formed along the peripheral direction of the passage forming main body 28. Thus, the passage formation member 24, when it receives external force of a designated level or greater, breaks at the fragile portion 27a before the second opening forming member 26 breaks. Thus, the peripheral part of the second opening forming member 26 does not break easily, and there is no loss of the sealing property by the second opening 26a due to the gasket GS.

(4)-17 As shown in FIG. 14 and FIG. 15, the insertion passage forming member 27 forms the insertion passage 11Pa that connects the first opening 23a and the second opening 26a, and guides the fueling nozzle FN from the first opening 23a to the second opening 26a, making fueling work easier. Also, the insertion passage 11Pa formed by the insertion passage forming member 27 is sealed in relation to the outside by the sealing member 29. Specifically, the sealing member 29 has a seal main body 29a, a first seal part 29c that seals between the opening peripheral edge of the first opening 23a formed as an integral unit with the seal main body 29a and the seal surface 32e of the first opening-closing member 31, and a second seal part 29d that seals between the first opening forming member 22 formed as an integral unit with the seal main body 29a and also arranged so as to enclose the outside of the first seal part 29c and the end part of the insertion passage forming member 27. With this kind of sealing member 29, the first seal part 29c and the second seal part 29d are formed as an integral unit, so the number of parts is low, and assembly is easy.

B. Second Embodiment

Figure 20:
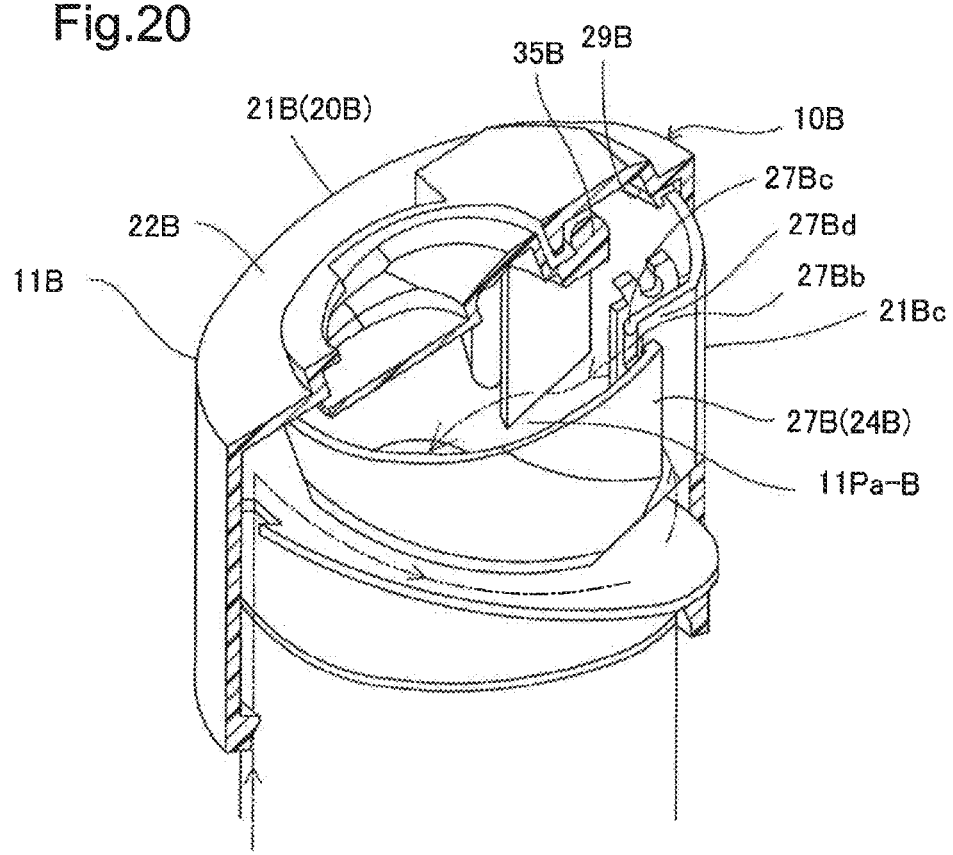
FIG. 20 is a partially fractured perspective view of the fuel tank opening-closing device of the second embodiment of the present invention.

FIG. 20 is a partially fractured perspective view of the fuel tank opening-closing device 10 of the second embodiment of the present invention. This embodiment has as its feature the constitution of the insertion passage forming member 27B and the sealing member 29B which constitute the tank opening forming member 11B. Specifically, the insertion passage forming member 27B has a recess 2713d formed from a curved wall 27Bc along the vertical direction in the drawing at both sides of the first shaft 35B. The recess 27Bd forms the vent forming member 21Bc constituting the cover member 20B as well as the passage of a portion of the vent passage 11Pc-B. Also, on the top part of the curved, wall 27Bc is formed a vent hole 27Bb which connects the insertion passage 11Pa-B and the vent passage 11Pc-B. This kind of vent passage 11Pc-B is a maze that detours around the outer periphery of the insertion passage forming member 27B with the vent hole 27Bb, so there is an even greater removal effect of dust and the like.

Figure 21:
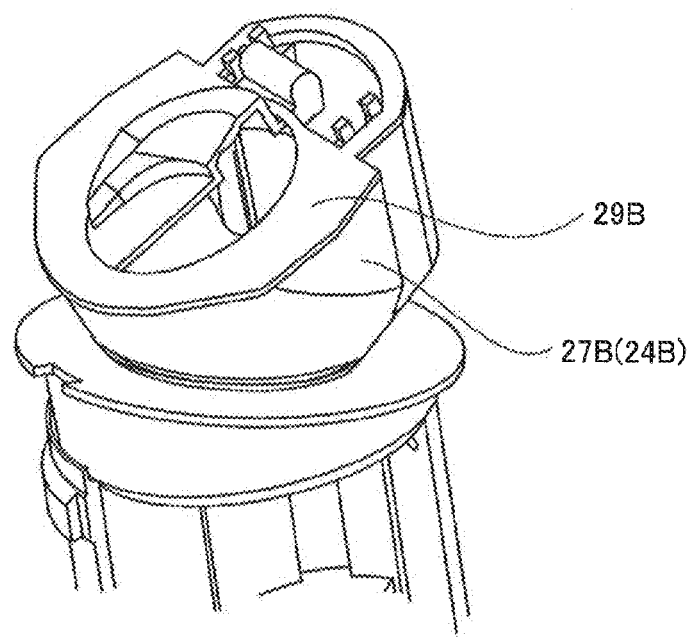
FIG. 21 is a perspective view showing the passage forming member.
Figure 22:
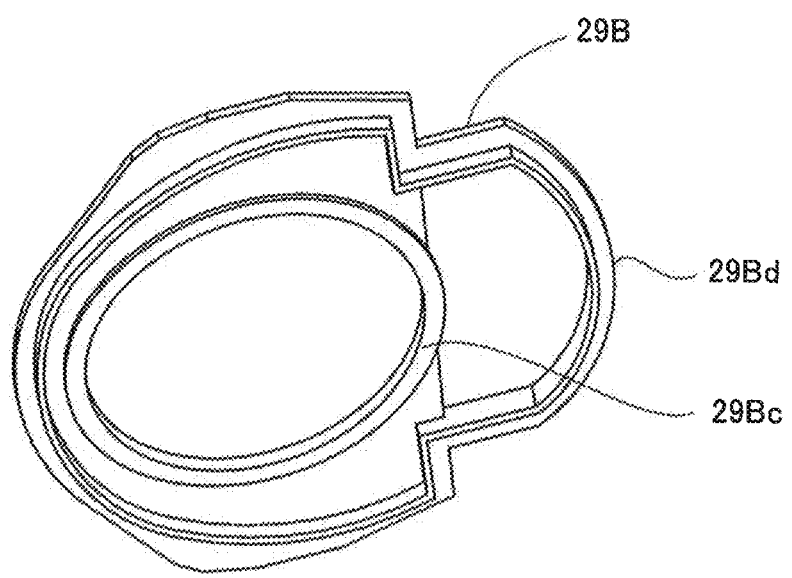
FIG. 22 is a perspective view showing the sealing member.

FIG. 21 is a perspective view showing the passage formation member 24B, and FIG. 22 is a perspective view of the sealing member 29B seen from underneath. In FIG. 22, the sealing member 29B is a shape with half cylinders of different outer diameters joined, is the same shape as the top edge part of the insertion passage forming member 27B of FIG. 21, and is interposed between the insertion passage forming member 27B and the first opening forming member 22B (FIG. 20). As shown in FIG. 22, the sealing member 29B can be any shape as long as it is a shape for which the first seal part 29Bc and the second seal part 29Bd are formed as an integral unit.

This invention is not limited to the embodiments noted above, and it is possible to implement various modes in a scope that does not stray from the gist of the invention.

Figure 13B:
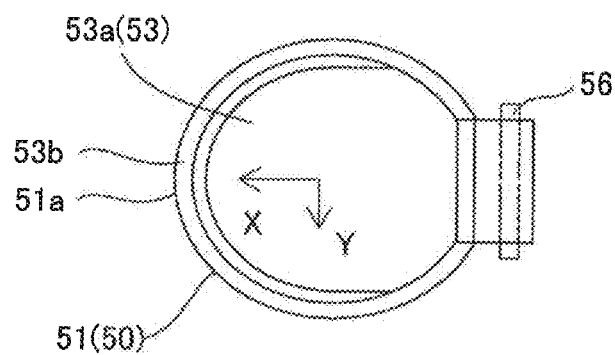

With the aforementioned embodiments, as shown in FIG. 13B, the sliding surface 53a of the second opening-closing member 51 is formed by a curved surface for which the surface area decreases in the second direction Y as it faces from the center of the second opening-closing member 51 toward the first direction X, but this is not limited to this, and the sliding surface can also be a straight line as long as the sliding end 31b of the first opening-closing member 31 is a shape for which sliding is possible with line contact. Also, the shape of second opening-closing member may also be square, and it is also possible to from a curved sliding surface on the top surface part formed in that square shape.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel tank opening-closing device that opens and closes a fuel passage for supplying fuel discharged by a fueling nozzle to a fuel tank, the fuel tank opening-closing device comprising:
   a tank opening forming member that includes (i) the fuel passage and (ii) a first opening forming member, disposed in the fuel passage and having a first opening, and
   a first flap valve mechanism having (i) a first opening-closing member for opening and closing the first opening, and (ii) a first shaft rotatably supporting an end part of the first opening-closing member on the first opening forming member,
   wherein the first opening-closing member includes:
   a pressing part that has (i) a push face pressed by an end of the fueling nozzle and (ii) a restriction wall forming a restriction region that restricts so as to selectively allow insertion of a specific outer form of the fueling nozzle, the restriction wall being configured to be erected along an outer edge of the push face and to enclose at least a portion of the push face, and
   a guide member that is formed and inclined to broaden a nozzle guiding space from an upper part of the restriction wall toward an insertion direction of the fueling nozzle, the guide member being configured to guide the end of the fueling nozzle to the restriction region, wherein
   the restriction wall has a flat part open at a side of the first opening-closing member and formed in a U-shape, wherein the flat part is disposed at a free end of the first opening-closing member.

2. The fuel tank opening-closing device in accordance with claim 1, further comprising:
   an opening and closing activation mechanism that includes (i) a nozzle detection member that is to be pressed by the end of the fueling nozzle and (ii) a locking member that works in conjunction with the nozzle detection member to have a locked position which locks the opening and closing operation of the first opening-closing member and an unlocked position which allows the opening and closing operation,
   wherein the nozzle detection member is disposed on the restriction wall, and switches the locking member from the locked position to the unlocked position by being pressed by the end of the fueling nozzle inserted in the restriction region.

3. The fuel tank opening-closing device in accordance with claim 2, wherein
   the tank opening forming member has a second opening forming member having the second opening, and disposed inside the fuel passage and more to the fuel tank side than the first opening forming member, and
   further comprises a second flap valve mechanism that includes (i) a second opening-closing member for opening and closing the second opening and (ii) a second shaft rotatably supporting an end part of the second opening-closing member.

4. The fuel tank opening-closing device in accordance with claim 3, wherein
the first opening-closing member includes an arc shaped sliding end formed on a free end of the first opening-closing member and at a side opposite a center axis of the fuel passage in relation to the first shaft, and
the second opening-closing member includes a sliding surface that slides the sliding end in line contact by the opening operation of the first opening-closing member.

5. The fuel tank opening-closing device in accordance with claim 4, wherein
the sliding surface is formed in a curved surface, where a first direction is from the second shaft to the free end of the second opening-closing member, and a second direction is perpendicular to the first direction, a surface area of the sliding surface in the second direction decreases from a center of the second opening-closing member in the first direction.

6. The fuel tank opening-closing device in accordance with claim 5, wherein
the sliding surface is to receive an opening force of the second opening-closing member when pressed by the end of the fueling nozzle.

7. The fuel tank opening-closing device in accordance with claim 6, wherein
the first opening-closing member and the second opening-closing member are disposed such that the sliding surface receives the opening force of the first opening-closing member by being pressed by the sliding end.

8. A fuel tank opening-closing device that opens and closes a fuel passage for supplying fuel discharged by a fueling nozzle to a fuel tank, the fuel tank opening-closing device comprising:
a tank opening forming member that includes (i) the fuel passage and (ii) a first opening forming member, disposed in the fuel passage and having a first opening, and
a first flap valve mechanism having (i) a first opening-closing member for opening and closing the first opening, and (ii) a first shaft rotatably supporting an end part of the first opening-closing member on the first opening forming member,
wherein the first opening-closing member includes:
a pressing part that has (i) a push face pressed by an end of the fueling nozzle and (ii) a restriction wall forming a restriction region that restricts so as to selectively allow insertion of a specific outer form of the fueling nozzle, the restriction wall being configured to be erected along an outer edge of the push face and to enclose at least a portion of the push face, and
a guide member that is formed and inclined to broaden a nozzle guiding space from an upper part of the restriction wall toward an insertion direction of the fueling nozzle, the guide member being configured to guide the end of the fueling nozzle to the restriction region, and
an opening and closing activation mechanism that includes (i) a nozzle detection member that is to be pressed by the end of the fueling nozzle and (ii) a locking member that works in conjunction with the nozzle detection member to have a locked position which locks the opening and closing operation of the first opening-closing member and an unlocked position which allows the opening and closing operation,
wherein the nozzle detection member is disposed on the restriction wall, and switches the locking member from the locked position to the unlocked position by being pressed by the end of the fueling nozzle inserted in the restriction region.

9. The fuel tank opening-closing device in accordance with claim 8, wherein
the first opening-closing member includes an arc shaped sliding end formed on a free end of the first opening-closing member and at a side opposite a center axis of the fuel passage in relation to the first shaft, and
the second opening-closing member includes a sliding surface that slides the sliding end in line contact by the opening operation of the first opening-closing member.

10. The fuel tank opening-closing device in accordance with claim 9, wherein
the sliding surface is formed in a curved surface, where a first direction is from the second shaft to the free end of the second opening-closing member, and a second direction is perpendicular to the first direction, a surface area of the sliding surface in the second direction decreases from a center of the second opening-closing member in the first direction.

11. The fuel tank opening-closing device in accordance with claim 10, wherein
the sliding surface is to receive an opening force of the second opening-closing member when pressed by the end of the fueling nozzle.

12. The fuel tank opening-closing device in accordance with claim 11, wherein
the first opening-closing member and the second opening-closing member are disposed such that the sliding surface receives the opening force of the first opening-closing member by being pressed by the sliding end.

13. A fuel tank opening-closing device that opens and closes a fuel passage for supplying fuel discharged by a fueling nozzle to a fuel tank, the fuel tank opening-closing device comprising:
a tank opening forming member that includes (i) the fuel passage and (ii) a first opening forming member, disposed in the fuel passage and having a first opening, and
a first flap valve mechanism having (i) a first opening-closing member for opening and closing the first opening, and (ii) a first shaft rotatably supporting an end part of the first opening-closing member on the first opening forming member,
wherein the first opening-closing member includes:
a pressing part that has (i) a push face pressed by an end of the fueling nozzle and (ii) a restriction wall forming a restriction region that restricts so as to selectively allow insertion of a specific outer form of the fueling nozzle, the restriction wall being configured to be erected along an outer edge of the push face and to enclose at least a portion of the push face, and
a guide member that is formed and inclined to broaden a nozzle guiding space from an upper part of the restriction wall toward an insertion direction of the fueling nozzle, the guide member being configured to guide the end of the fueling nozzle to the restriction region, wherein
the tank opening forming member has a second opening forming member having the second opening, and disposed inside the fuel passage and more to the fuel tank side than the first opening forming member, and
further comprises a second flap valve mechanism that includes (i) a second opening-closing member for opening and closing the second opening and (ii) a second shaft rotatably supporting an end part of the second opening-closing member.

14. The fuel tank opening-closing device in accordance with claim 13, wherein
the first opening-closing member includes an arc shaped sliding end formed on a free end of the first opening-closing member and at a side opposite a center axis of the fuel passage in relation to the first shaft, and
the second opening-closing member includes a sliding surface that slides the sliding end in line contact by the opening operation of the first opening-closing member.

15. The fuel tank opening-closing device in accordance with claim 14, wherein
the sliding surface is formed in a curved surface, where a first direction is from the second shaft to the free end of the second opening-closing member, and a second direction is perpendicular to the first direction, a surface area of the sliding surface in the second direction decreases from a center of the second opening-closing member in the first direction.

16. The fuel tank opening-closing device in accordance with claim 15, wherein
the sliding surface is to receive an opening force of the second opening-closing member when pressed by the end of the fueling nozzle.

17. The fuel tank opening-closing device in accordance with claim 16, wherein
the first opening-closing member and the second opening-closing member are disposed such that the sliding surface receives the opening force of the first opening-closing member by being pressed by the sliding end.

* * * * *